(12) United States Patent
Duncan et al.

(10) Patent No.: US 6,496,265 B1
(45) Date of Patent: Dec. 17, 2002

(54) FIBER OPTIC SENSORS AND METHODS THEREFOR

(75) Inventors: Paul Grems Duncan, Vienna, VA (US); Sean Michael Christian, Woodbridge, VA (US); Kevin Anthony Shinpaugh, Blacksburg, VA (US)

(73) Assignee: Airak, Inc., Manassas, VA (US)

( * ) Notice: Subject to any disclaimer, the term of this patent is extended or adjusted under 35 U.S.C. 154(b) by 0 days.

(21) Appl. No.: 09/783,390

(22) Filed: Feb. 15, 2001

Related U.S. Application Data
(60) Provisional application No. 60/182,893, filed on Feb. 16, 2000.

(51) Int. Cl.$^7$ .............................................. G01B 9/02
(52) U.S. Cl. ...................................... 356/479; 356/35.5
(58) Field of Search ................................ 356/451, 454, 356/455, 477, 480, 479, 482, 497, 35.5; 250/227.19, 227.27

(56) References Cited

U.S. PATENT DOCUMENTS 5,017,010 A * 5/1991 Mamin et al. .............. 356/345

\* cited by examiner

*Primary Examiner*—Robert H. Kim
*Assistant Examiner*—Jurie Yun
(74) *Attorney, Agent, or Firm*—Greenberg Traurig; Richard E. Kurtz, II

(57) ABSTRACT

A method for calculating a distance from a fiber optic tip of a sensor to a reflective surface by high pass filtering a fringe signal gathered by a spectrometer, calculating a power spectral density of the filtered signal, and using a calibrated distance vs. peak spectral density wavelength curve to determine the measured distance. This fiber optic distance measurement technique can be applied to a variety of sensor types, including, but not limited to, pressure, displacement, temperature, acoustic, pressure, load, and magnetic field sensors.

8 Claims, 27 Drawing Sheets

FIBER OPTIC SENSORS AND METHODS THEREFOR

This application claims the benefit of U.S. Provisional Patent Application No. 60/182,893, filed on Feb. 16, 2000, the entire disclosure of which is incorporated herein by reference.

This application is related to U.S. Utility Patent Application entitled "Apparatus and Method for Volumetric Dilatometry," filed Feb. 15, 2001, by inventors Paul Grems Duncan, Sean Michael Christian, Kevin Anthony Shinpaugh, and Hervé Marand, the entire disclosure of which is incorporated herein by reference.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

This application discloses an innovative fiber optic sensor technology, and the associated electro-optic subsystems and signal-processing algorithm.

BACKGROUND AND SUMMARY OF THE INVENTION

Interferometric Sensor Principle of Operation

Shown in FIG. 1 are five examples of potential sensor configurations that can be used to monitor displacement using the disclosed electro-optic configuration and algorithm. Each example given utilizes the sensor (fiber) end face/gap interface to generate a first surface reflection. With each configuration shown, two sensing schemes are available. The first scheme is a fixed fiber/mobile reflector methodology and the second is a mobile fiber/fixed reflector methodology. With respect to dilatometry, a fixed fiber/mobile reflector scheme is employed.

The first configuration shown in FIG. 1 (a) places a graded-index (GRIN) lens at the end of a fiber. This configuration has the advantage of being able to collimate the light beam to enable longer-distance measurements (larger dynamic range). Configuration (b) allows for a decrease in the cross-sectional sensor profile of configuration (a) through the implementation of a spliced multi-mode graded-index fiber. Note that with this configuration the length of the multi-mode fiber is not arbitrary. Configuration (c) further reduces the cross-sectional sensor profile. Configuration (d) represents the configuration implemented within this disclosure. A standard single-mode fiber is cleaved and/or polished at an angle $\phi$, which has been shown to improve the signal to noise ratio. Finally, configuration (e) represents an alternative approach.

In all five configurations the operation is the same: light energy enters from the left in the lead-in fiber and approximately 4% is reflected at the glass/gap interface (this is termed the Fresnel reflection). The remaining energy is coupled into the gap region, where it traverses the gap and is reflected by a reflector. After traveling back to the fiber interface some of the reflected energy is coupled back into the fiber, where it modulates the Fresnel reflection. If the reflecting modulation is in phase with the Fresnel wave the two constructively interfere, else if they are out of phase they destructively interfere. The first surface reflection can be strengthened or weakened through the use of specific coatings (see FIG. 3).

Sensor Fabrication

Fringe visibility, or the absolute height difference between the maximum and minimum peaks in the interferogram, is an important parameter that directly impacts system accuracy. In order to maximize fringe visibility, hence, increase signal to noise ratio, several options are available: 1) the use of GRIN lenses, 2) the use of a short piece of graded index fiber fusion spliced at the sensor tip, or 3) the use of polishing to increase the reflectance of the two surfaces. Additionally, recent calculations by Airak personnel indicate that a slight angle, induced at the fiber end-face, can contribute to a slight increase in fringe visibility (see FIG. 1).

Optical System Configuration

For this disclosure the configuration of the optical subsystems is as follows: a light emitting diode (LED) with a center wavelength of 850 nm and 20 mn full width half-maximum serves as the light source and a StellarNet, Inc. EPP2000 spectrometer serves to digitize the broadband interferometric signal. The spectrometer possesses a 2048 pixel array and a wavelength range of 550–1000 nm. Interface to the computer is through an EPP parallel port. There are many optical system configurations possible and configuration examples addressed are not meant to limit in any manner the number of realizable configurations. The novel aspects of the system are 1) the use of a spectrometer, 2) the sensor configurations and 3) the signal processing algorithm.

In order to validate the statement aforementioned concerning the number of available optical configurations for measuring displacements with high accuracy over a given dynamic range (i.e. specific to the application of interest), computer simulations are given below. The simulations rely on white-light interference patterns with known parameters [displacement gap and signal-to-noise ratio (SNR)]. The variables of interest are the mean and standard error of the source profile, 2) the number of pixels in the spectrometer, and 3) the wavelength range of the spectrometer.

FIG. 4 through FIG. 7 depict the results of the computer simulations for two different optical configurations. The mean error (bias error) represents the accuracy of the measurement and can be reduced through proper calibration. The random error (variance) represents the resolution of the system and cannot be reduced through calibration[1].

[1] J. S. Bendat and A. G. Piersol, Random Data, John Wiley and Sons, 1986.

FIG. 4 and FIG. 5 are representative of the first configuration. This configuration employs a LED centered at 850 nm with a 50 nm full-width half-max and a spectrometer with a wavelength range of 750–950 nm. Typically, the SNR realized for the disclosed system was between 30 and 40 dB, therefore the mean error was less than 0.5 nm and the resolution was less than a nanometer.

FIG. 6 and FIG. 7 are representative of the second configuration. This configuration employs a broadband white-light source and uses StellarNet's EPP2000c spectrometer which has a wavelength range of 200–850 nm. This results in a system accuracy increase of approximately two orders of magnitude.

These computer simulations indicate how the system accuracy, range and resolution are affected by changing the optical parameters. Using this information, the optical system can be tailored to meet specific requirements in range or accuracy.

Although several options exist for the design and construction of the integrated opto-electronics, common to all systems are the LED light source, the LED driver & optical coupler subsystem, the sensors, at least one spectrometer, some form of analog to digital conversion subsystem, a control and feedback subsystem, a digital to analog conversion subsystem, and the signal processing algorithm to process the signal.

DETAILED DESCRIPTION OF THE PREFERRED EMBODIMENTS

Detailed Description of the Fiber-Optic Displacement Sensor

Figure 1:
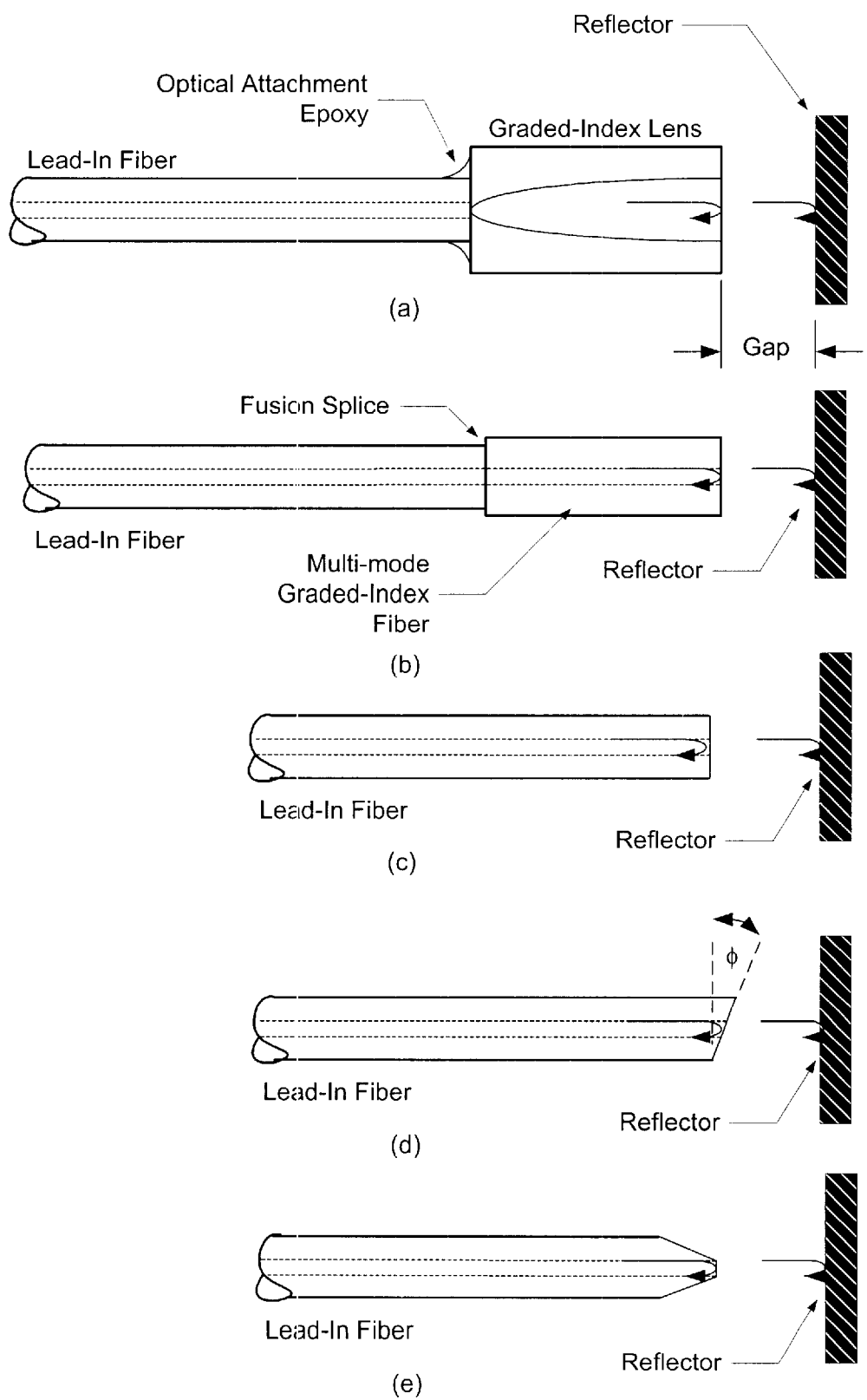
FIG. 1 is a perspective view of several interferometric sensor configurations that can sense changes in a gap distance between the optical system and the reflecting surface. Each configuration has inherent advantages and disadvantages.
Figure 2:
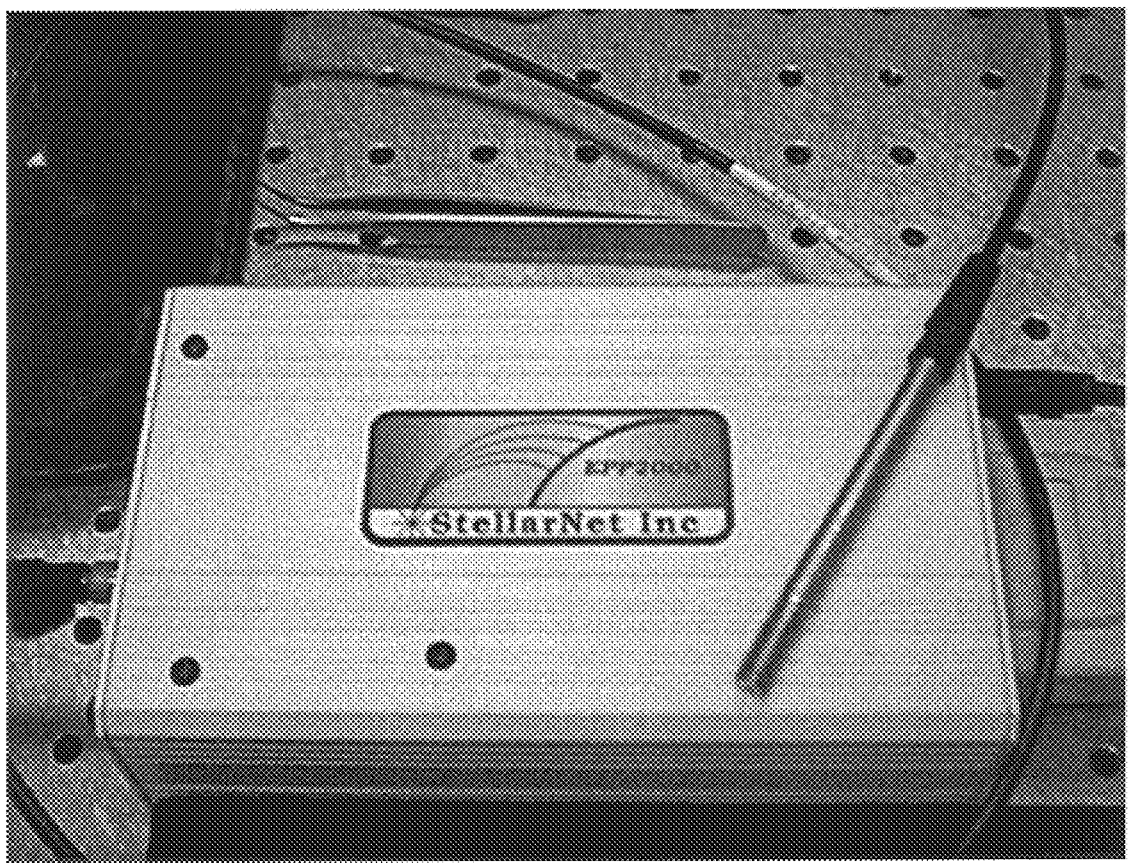
FIG. 2 is a photograph showing one configuration of the disclosed sensor technology and is not meant to be representative of all possible configurations. Shown are the sensor and the spectrometer which is addressed below.
Figure 3:
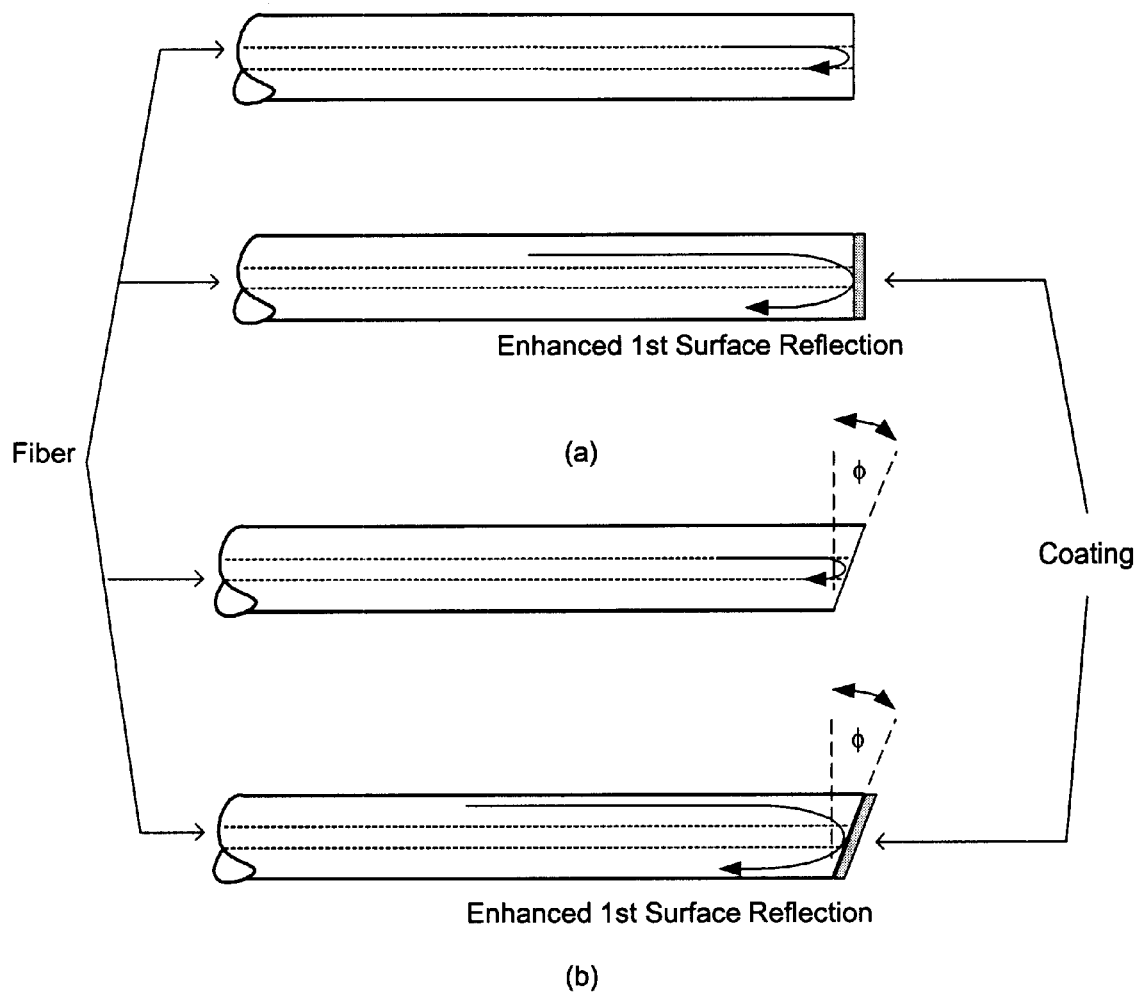
FIG. 3 illustrates that through the application of specific coatings, the 4% reflection at the glass/gap interface (1st surface reflection) can be increased.
Figure 4:
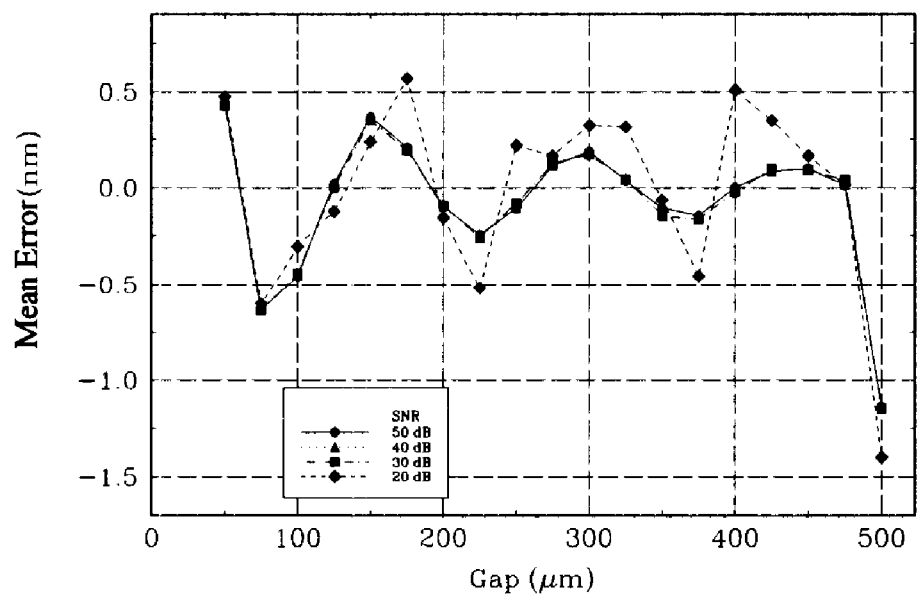
FIG. 4 is a graph illustrating computer simulations of mean error as a function of displacement gap and SNR for optical system with 850 nm SLED and spectrometer with range of 750–950 nm.
Figure 5:
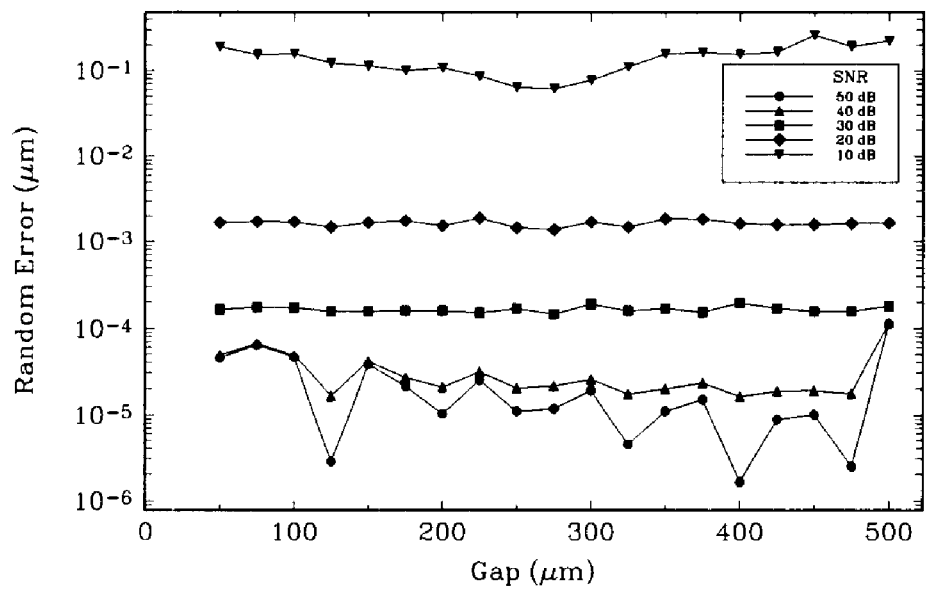
FIG. 5 is a graph illustrating computer simulation of random error as a function of displacement gap and SNR for optical system with 850 nm SLED and spectrometer with range of 750–950 nm.
Figure 6:
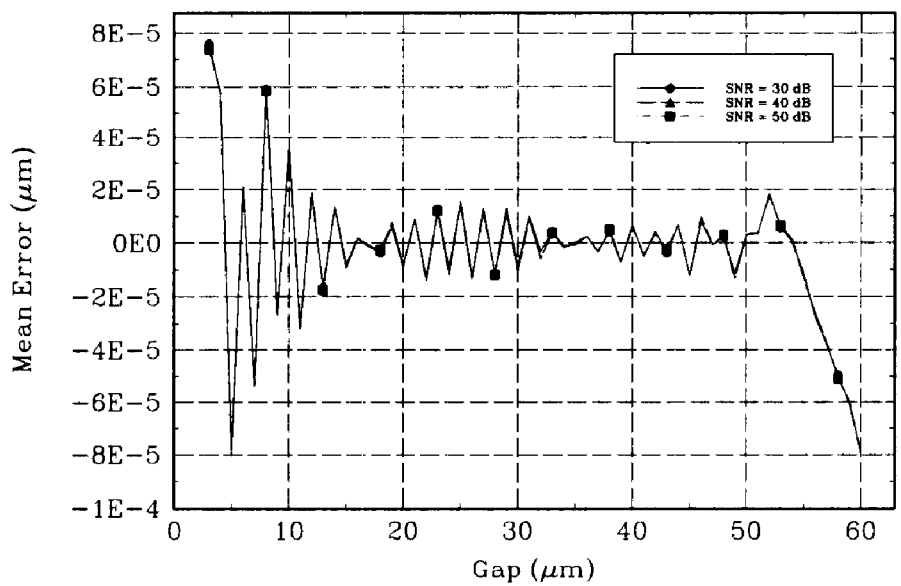
FIG. 6 is a graph illustrating computer simulation of mean error as a function of displacement gap and SNR for an optical system using a white-light source and a spectrometer with range of 200–850 nm.
Figure 7:
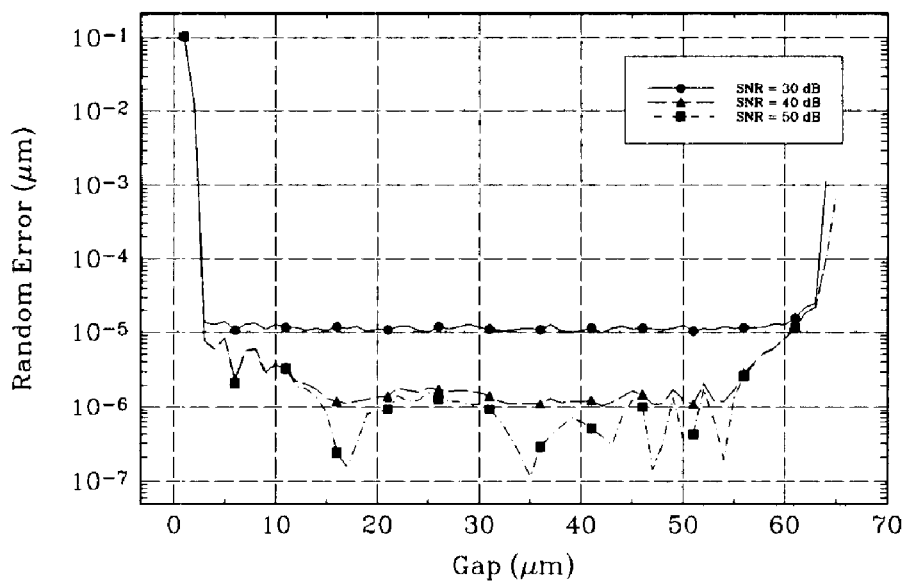
FIG. 7 is a graph illustrating computer simulation of random error as a function of displacement gap and SNR for an optical system using a white-light source and a spectrometer with a range of 200–850 nm.
Figure 8:
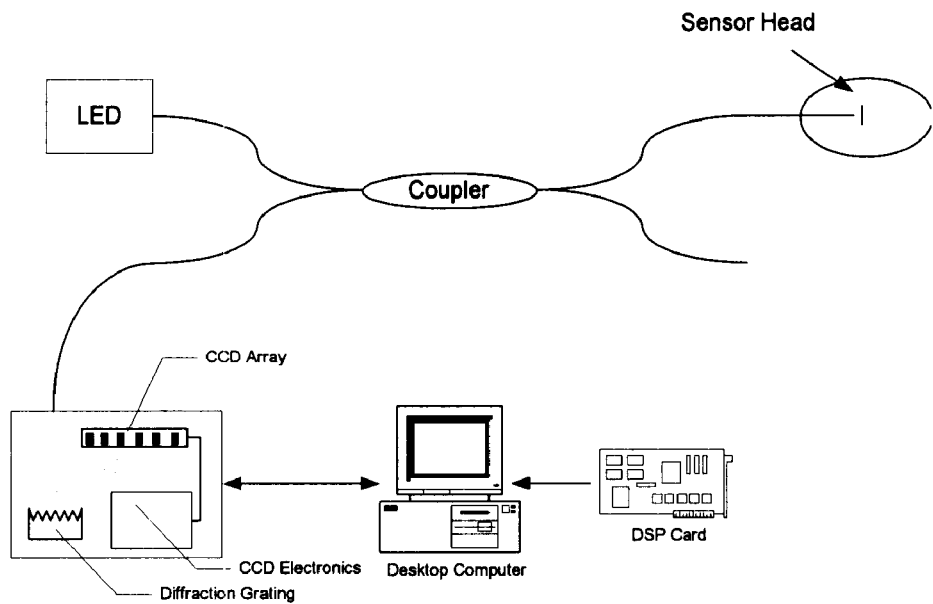
FIG. 8 is a schematic of a broadband interferometric fiber optic sensor system.

The fiber optic displacement sensor is based on white-light interferometry. FIG. 8 shows the basic functional block diagram of a wavelength encoded optical fiber sensor system. A light-emitting diode is employed as the energy source to launch light into a single-mode optical fiber. The broadband light propagates to the sensor through an optical coupler, and reflects back, first, from the glass-air interface of the input/output fiber, and second, from the interface of the reflector.

The first reflection is termed as the reference reflection while the second reflection is termed as the sensing reflection. A reflection of desired percentage can be achieved from the 2nd interface by applying appropriate thin film coatings to the reflector surface. Interference occurs between the backward propagating waves of the reference and sensing reflections 2.

The reflected light propagates back to the end of a fiber through the optical coupler and is incident on a diffraction grating, which separates the light components by diffracting different wavelengths at different angles on to a CCD array.

The CCD array integrates the intensity of different wavelength components of the light at different elements of the array which results in an electrical signal pattern with discrete amplitude pulses which are a function of 1) the linear fringe pattern of the interfering waves, 2) the sensor air gap, 3) the profile of the light launched from the LED, 4) the responsivity profile of the CCD photo-diodes, and 5) the optical characteristics of the fiber/coupler system. The discrete analog pulses output by the CCD array are digitized and transferred to a digital signal processing (DSP) unit, which does all the necessary processing of the digital signal, in real-time, to determine the gap length of the sensor.

The sensor system shown in FIG. 8 can measure gap length between an input/output fiber and a reflector spacing, and hence the movement (magnitude and direction) of the reflector movement, with respect to the input/output fiber. This is unlike single frequency phase measurement interferometry, where the absolute position of the reflector with respect to the reference is never known and displacement in excess of $\lambda/4$ ($\lambda$ being the wavelength of the light in free space) becomes ambiguous.

Light Sources

Figure 9:
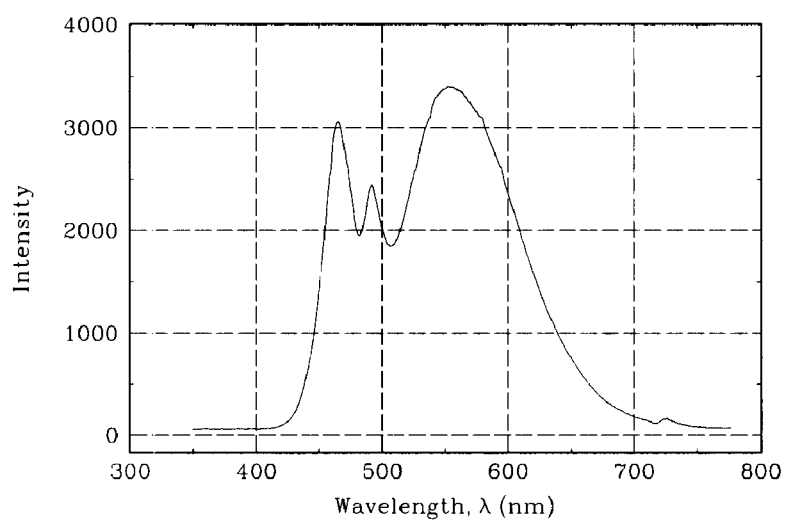
FIG. 9 is a graph illustrating white light spectrum produced from a new line of sources available only on a R&D basis from Hewlett-Packard. The advantage of these sources is the cost is nearly 2 orders of magnitude less than conventional white-light or broadband sources. The disadvantage of these sources is that the light is not as intense as other sources when coupled into optical fiber.

Computer simulations show that to achieve highest sensitivity, the sources and spectrometer should operate at lower wavelengths. There are limited semiconductor devices below 600 nm wavelength; however, Hewlett-Packard has just released a new white-light LED for R&D evaluation purposes that shows great promise. See FIG. 9. Other, non-semiconductor based light sources include tungsten krypton bulbs, which have a wavelength range 350–1600 nm and a deuterium lamps, which extend down to 200 nm.

The System Signal Response and Algorithm

Figure 10A:
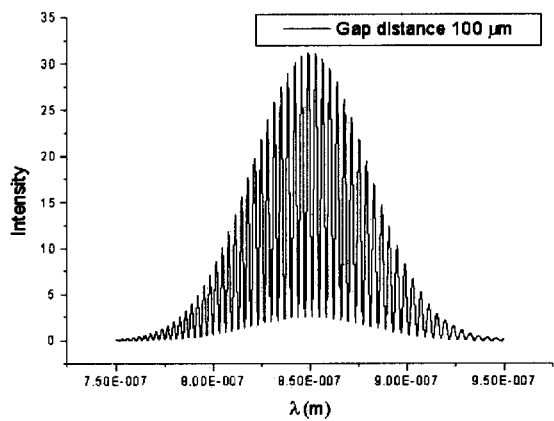
FIGS. 10a through 10c are a series of graphs illustrating typical signal response of the sensor system for a gap of 100, 50 and 20 microns.
Figure 10B:
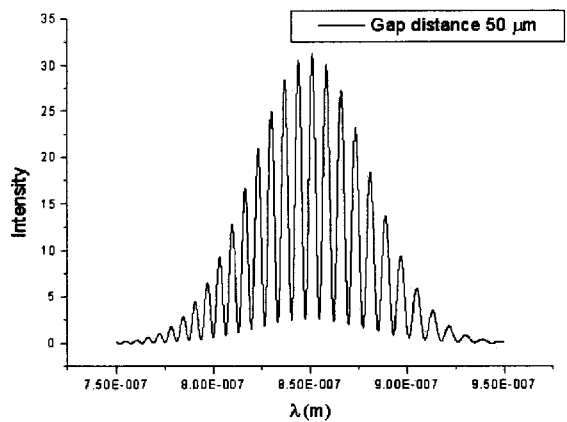
Figure 10C:
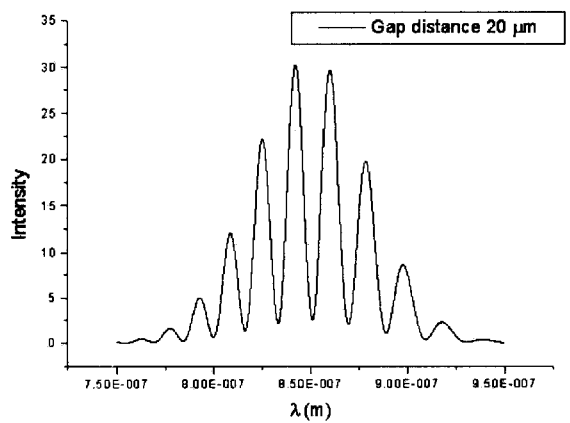

FIG. 10 shows the signal response of the wavelength modulated sensor system for an air gap of 100, 50.0, and 20 μm. Due to the approximate Gaussian profile of the LED optical source, the signal response is a Gaussian amplitude modulated fringe pattern. As the length of the air gap increases, the number of wavelengths which can satisfy the condition of in-phase addition, after being reflected from the reference interface and the sensing interface, also increases, increasing the number of fringe peaks, and decreasing the distance (in terms of wavelength) between adjacent fringe peaks. Note that the frequency of occurrence of fringe peaks decreases gradually towards the higher end of wavelength values, i.e., there is a chirp present in the frequency of the fringe pattern. This chirp is due to the fact that the condition of in-phase addition, after being reflected from the reference interface and the sensing interface, is met more frequently (in terms of wavelength distances) at lower wavelengths, and gradually decreases with increasing wavelengths.

To achieve higher accuracy, the phase information from the spectral signal can be recovered. This is accomplished be taking the Fourier transform of the spectral signal S(υ):

$$G(\delta) = \int S(\upsilon) e^{-i2\pi\upsilon\delta/c} d\delta \quad (1)$$

The function G(δ) consists of a zero harmonic corresponding to the spectral distribution of the source and a couple of first harmonics corresponding to the fringe pattern. The phase information is contained in the first harmonics. A Fourier transform is taken of g(δ) which is G(δ) with the zero harmonic subtracted out:

[2] V. Bhatia, *Signal Processing Techniques for Optical Fiber Sensors Using While Light Interferometry*, Master's Thesis, Bradley Department of Electrical Engineering, Virginia Tech, 1993.

$$f(\upsilon) = 2 \int g(\delta) e^{i2\pi\upsilon\delta/c} d\upsilon \quad (2)$$

The complex function $f(\upsilon)$ gives the proper relation between phase ψ and light frequency υ. The sensor gap is determined from the derivative of ∂ψ/∂υ:

$$g = \left(\frac{\partial\varphi}{\partial\upsilon}\right)\frac{c}{4\pi} \quad (3)$$

Given this, and after some manipulation, the maximum gap that can be processed with the algorithm is given:

$$g_{max} = \frac{Nc}{4(\upsilon_1 - \upsilon_N)} \quad (4)$$

where N is the number of pixels, c is the speed of light in a vacuum, $\upsilon_1$ is the frequency of light at pixel 1, and $\upsilon_N$ is the frequency of light at last pixel. Hence, for a spectrometer with 2048 pixels and scan of 750 to 950 nm, the theoretical maximum detectable gap is 1.8 mm. In reality, the gap will probably be less due to signal to noise considerations within the detection opto-electronic subsystems. Additionally, although from a user-viewpoint this is an irrelevant specification, from the designer's viewpoint this is a very important specification, for it indicates how far the reflector can be from the fiber end-face.

The disclosed, miniature, high accuracy, displacement sensor is an enabling technology applicable to any application which requires the measurement of absolute distance and/or displacement. Five such applications are detailed below. The following list is by no means inclusive.

Application One: Dilatometry

Figure 11A:
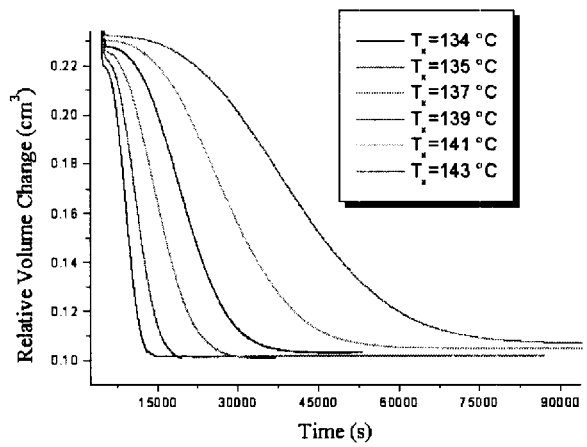
FIGS. 11a through 11c are a series of graphs illustrating dilatometric properties. The upper graphic illustrates the ability of a dilatometer to measure crystallization kinetic parameters. The data is representative of the classic Avrami behavior exhibited upon primary crystallization. The middle graphic illustrates the power of dilatometry for it depicts both the glassy and the melt CTE's; the Tg for the relatively amorphous material at 71° C.; the volume decrease upon crystallization for 12 hours, and the Tg of the semicrystalline material which has been shifted to higher temperatures and broadened due to crystalline constraints upon the remaining amorphous fraction. Note that the slopes of the amorphous and semicrystalline melts differ. This is due to the aforementioned constraints. The lower graphic depicts the volumetric aging rate (βv) of a material, which is simply the normalized slope of a linear representation of a non-linear relaxation process.
Figure 11B:
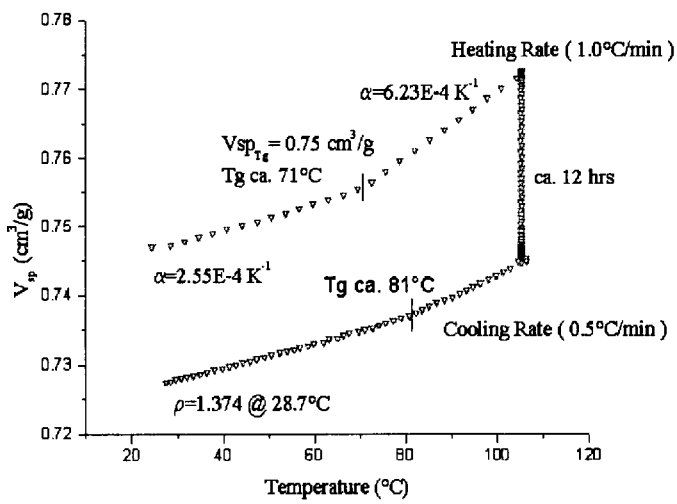
Figure 11C:
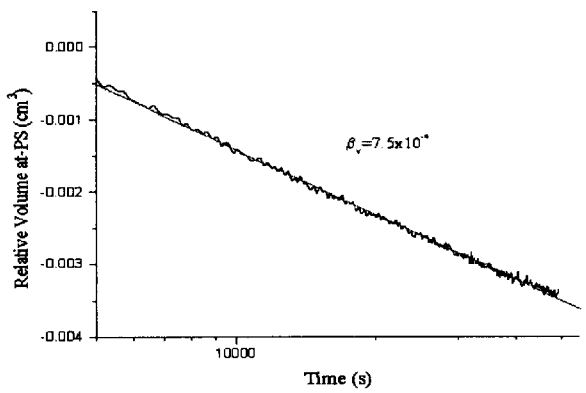

The disclosed technology has enabled the development of a state-of-the-art volumetric dilatometer (FIG. 11 shows data from a prior art volumetric dilatometer). The resolution of the next generation device which employs the disclosed sensor technology is two-to-three orders of magnitude higher than the prior art device used to generate the data in FIG. 11.

Example Two: Thin Film Measurements

Figure 12:
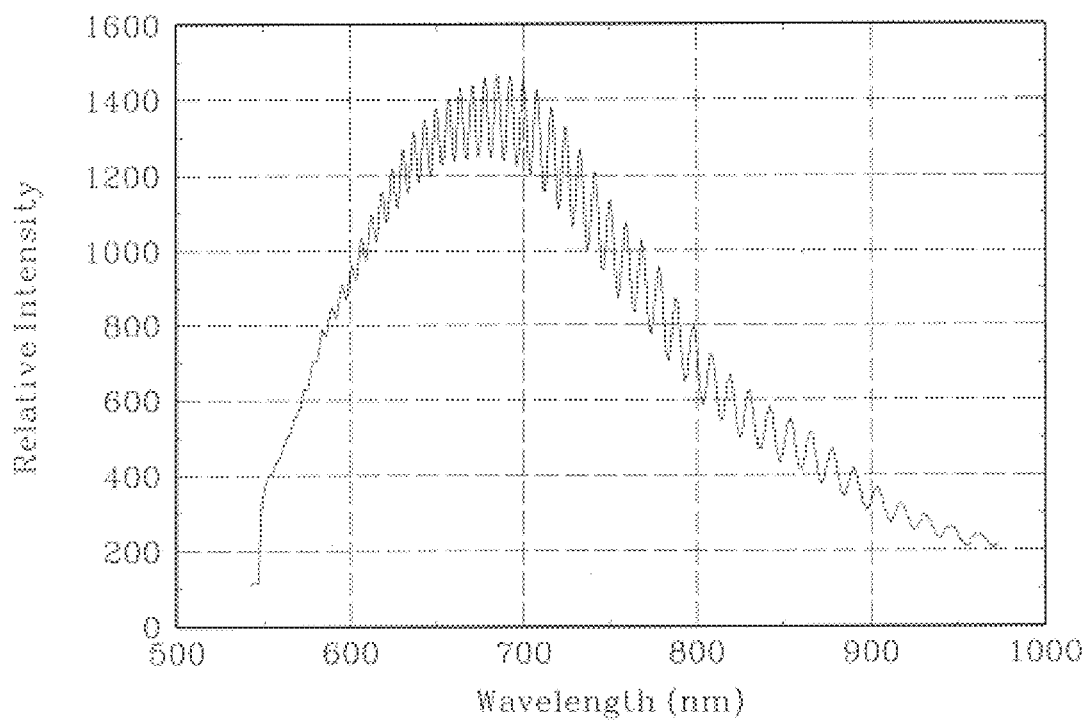
FIG. 12 is a graph illustrating white-light interference fringe patter from 100 μm thin-film.

The thickness of thin films can be measured with the disclosed fiber-optic displacement sensor. Using a high intensity white-light source incident on the thin film, the reflected light from the front and back surfaces of the thin film could be picked up by a large core multimode optical fiber. FIG. 12 shows the fringe pattern detected from a 100 $\mu$m thick film. Thinner films can be measured by using a UV source and spectrometer. Thin-films as thin as 0.25 $\mu$m can be measured with a resolution on the order of 0.001 nm.

This technology enables manufacturers that use thin-films in their products to more accurately control the thickness of these films as they are laid down, which will result in better optical coatings and electronic devices (i.e. accurate control over crystal growth rates and thicknesses).

Application Three: Load Cells

The disclosed sensor system can be applied to load-cells. This is especially attractive in a wide range of harsh environment applications, especially where conventional load-cells are difficult to use (i.e. areas of extreme temperature, high radiation, and/or high EMI) and on multi-component micro balances where size is of concern.

In reference to the application of a multi-component force balance, the following claims are made about the sensor technology:

1) It is extremely small in profile (fiber diameter is 250 $\mu$m),
2) It requires no special attachment methods (cyanoacrylate was used for attachment of the fiber to the test specimens),
3) It requires only to be positioned across from a reflecting surface with the normal component of the reflecting surface parallel to the fiber axis,
4) It removes the concerns of other competitor's fiber sensors through removal of interface boundaries and subsequent errors in strain transmission, and It exhibits a high degree of isolation to the normal and side forces while measuring the pitch and yaw moments.

Figure 13:
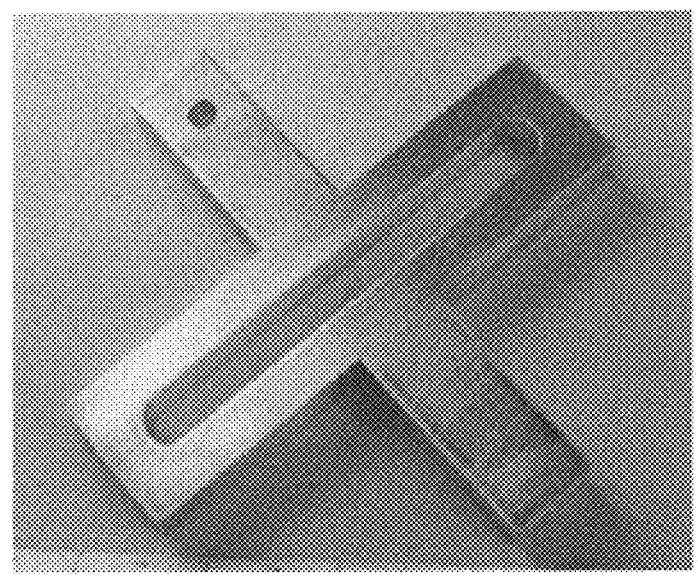
FIG. 13 is a top view of a prototype single-component force balance (load cell) employing bending moments.
Figure 14:
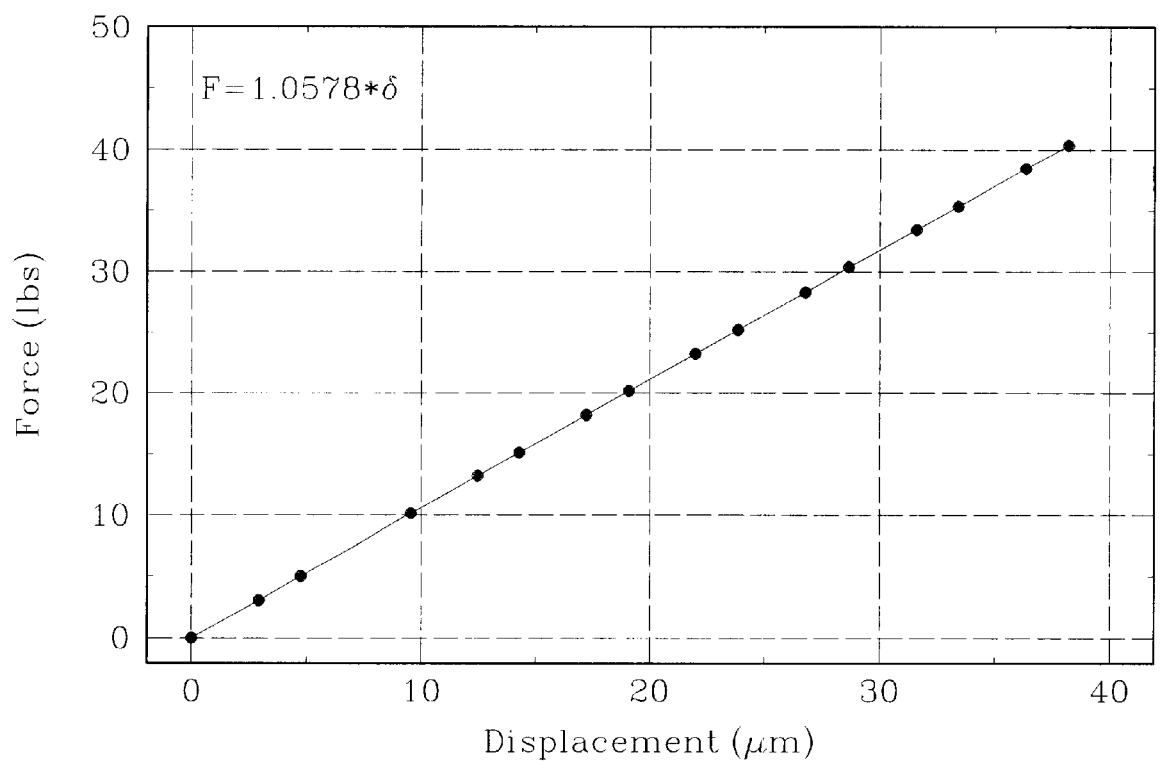
FIG. 14 is a graph illustrating Calibration results for prototype single-component force balance measuring axial load. The balance of FIG. 13 appears to minimize interactions from other forces and moments due to the fact that rotation about the optical reflection path does not affect the sensor output.

Two simple prototype force balances systems were designed and machined out of aluminum. Both load cells were nominally designed for a 50 lbs. axial load with the resulting strain being less than 800 $\mu\epsilon$. The change in gap (displacement) between the fiber-optic tip and a reference-reflecting surface is related to the applied load or force. The first balance design, shown in FIG. 13 was 5 in. long, 4.5 in. wide and 0.375 in. thick and was loaded under pure tension. The optical fiber was attached to an aluminum rod passed through the center of the lower section. The reflecting surface was a glass slide attached under the midsection of the upper arm. For the designed load, the change in gap between the fiber end-face and the reflecting surface was approximately 38 $\mu$m (see FIG. 14).

Figure 15:
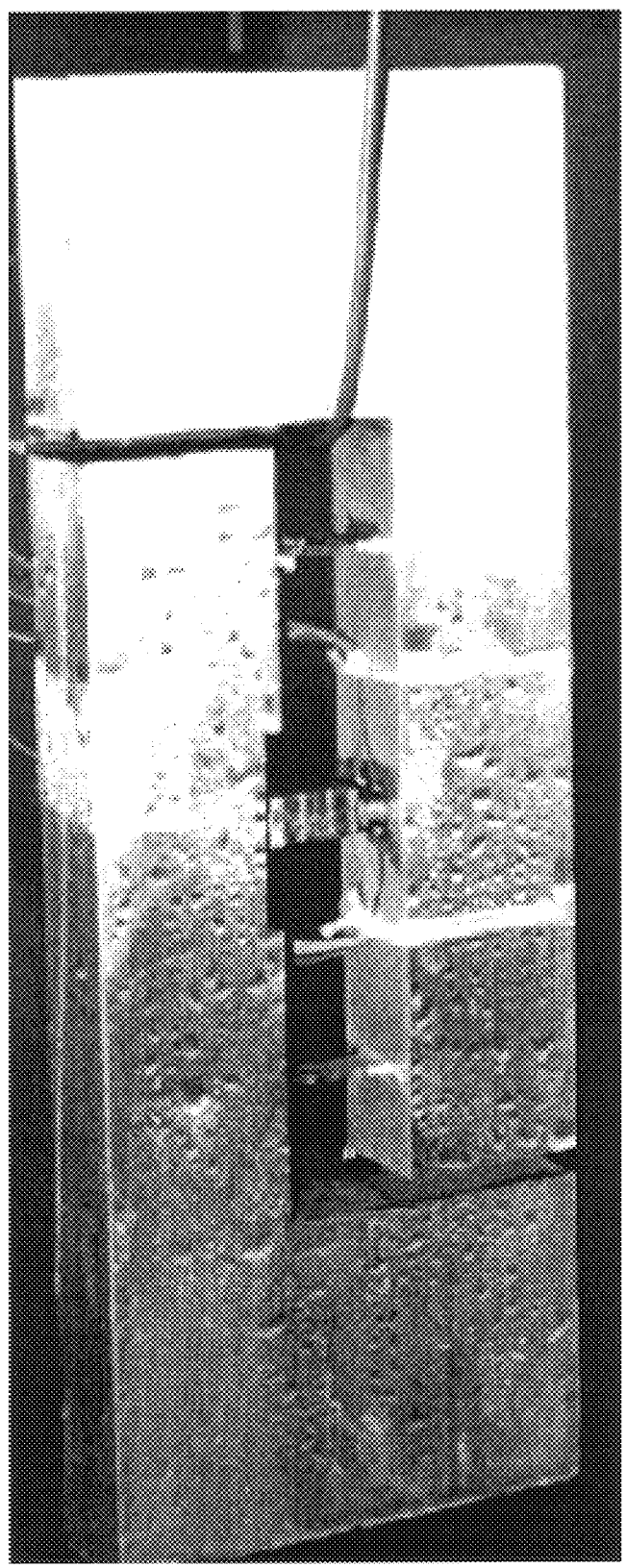
FIG. 15 is a photograph of an axial force balance with a fiber-optic displacement sensor located on the side of the balance.
Figure 16:
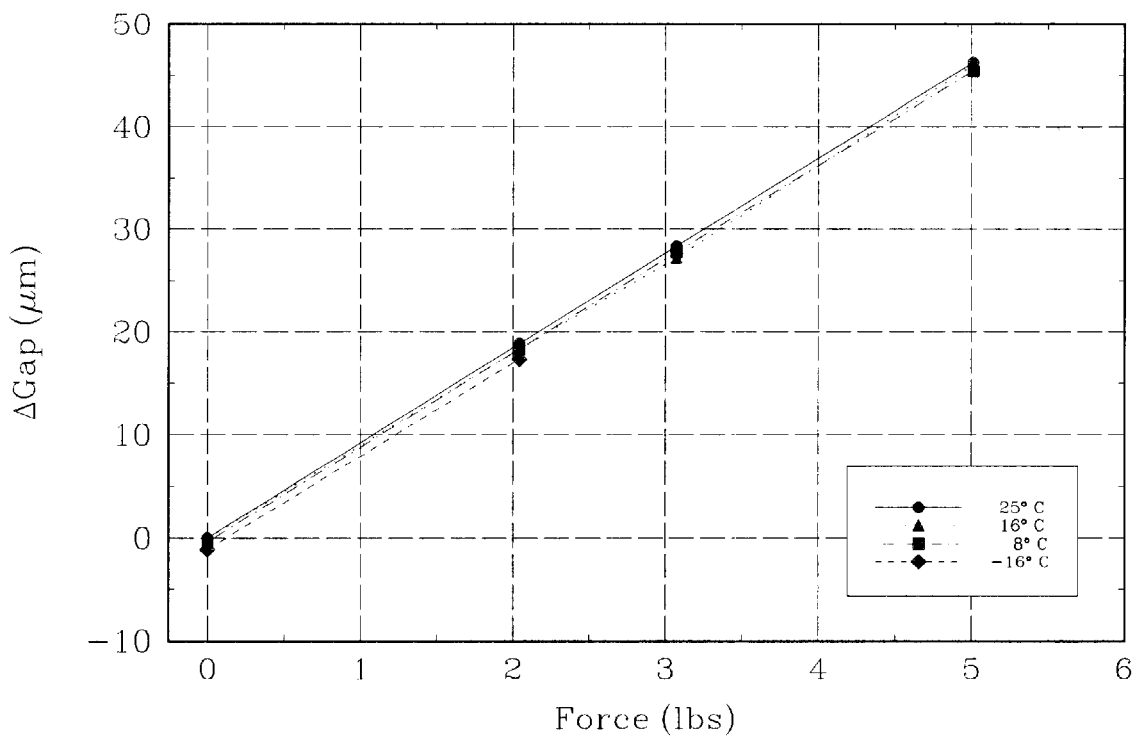
FIG. 16 is a graph illustrating changes in gap with applied load and temperature for the axial force balance with fiber-optic displacement sensor.

The second balance design axially loaded and displayed a change in gap of approximately 7 $\mu$m for a load of 50 lbs (see FIG. 15 and FIG. 16)

Figure 17:
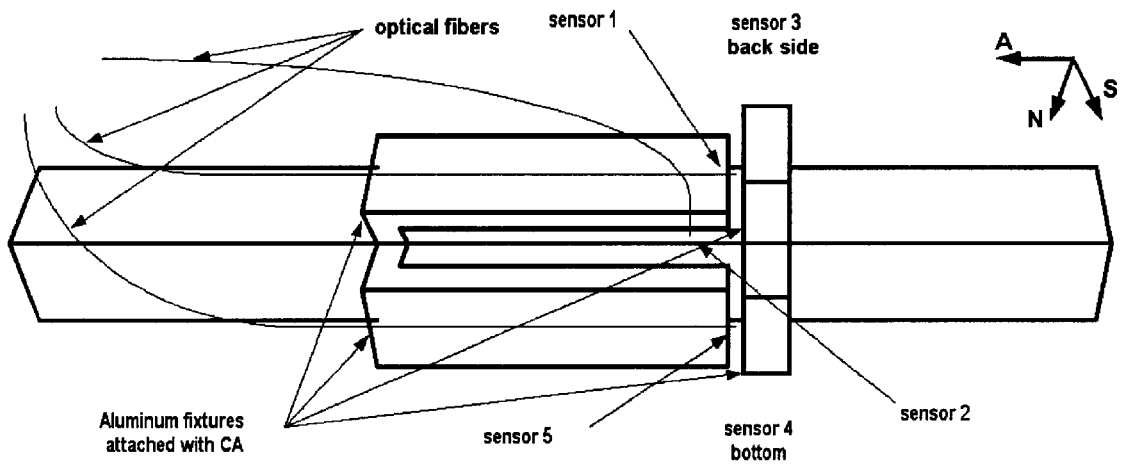
FIG. 17 is a side perspective view of a modified five-component balance with fiber optic displacement sensors.

FIG. 17 depicts a five-component balance that consisted of a symmetric four-post cage section for measuring normal, side, roll moment, pitch moment, and yaw moment. The design loads for this balance were 50 lbs. for normal and side force, 80 in-lbs. for pitch and yaw moment, and 25 in-lbs. for roll moment.

Figure 18A:
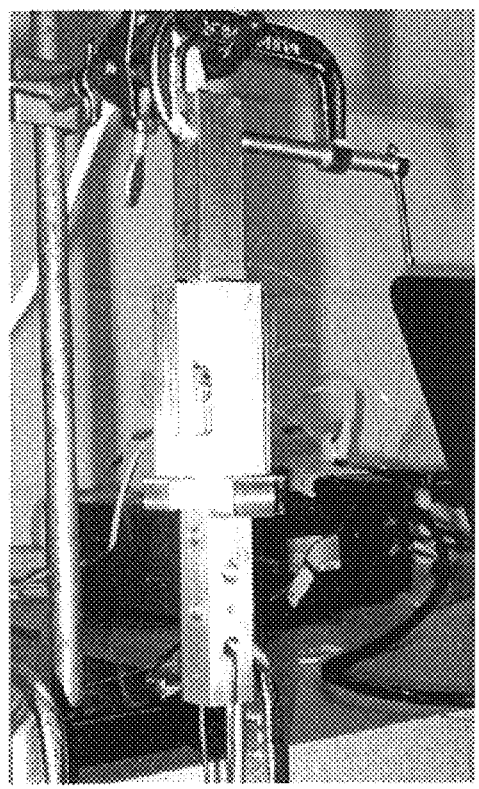
FIGS. 18a and 18b are photographs illustrating a sample modified five-component balance with fiber optic displacement sensors undergoing load tests.
Figure 18B:
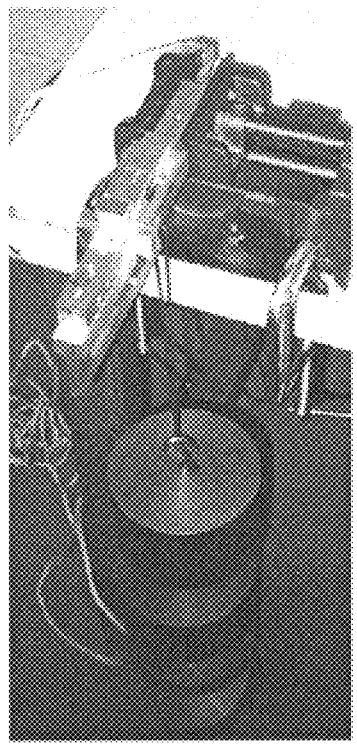
Figure 19:
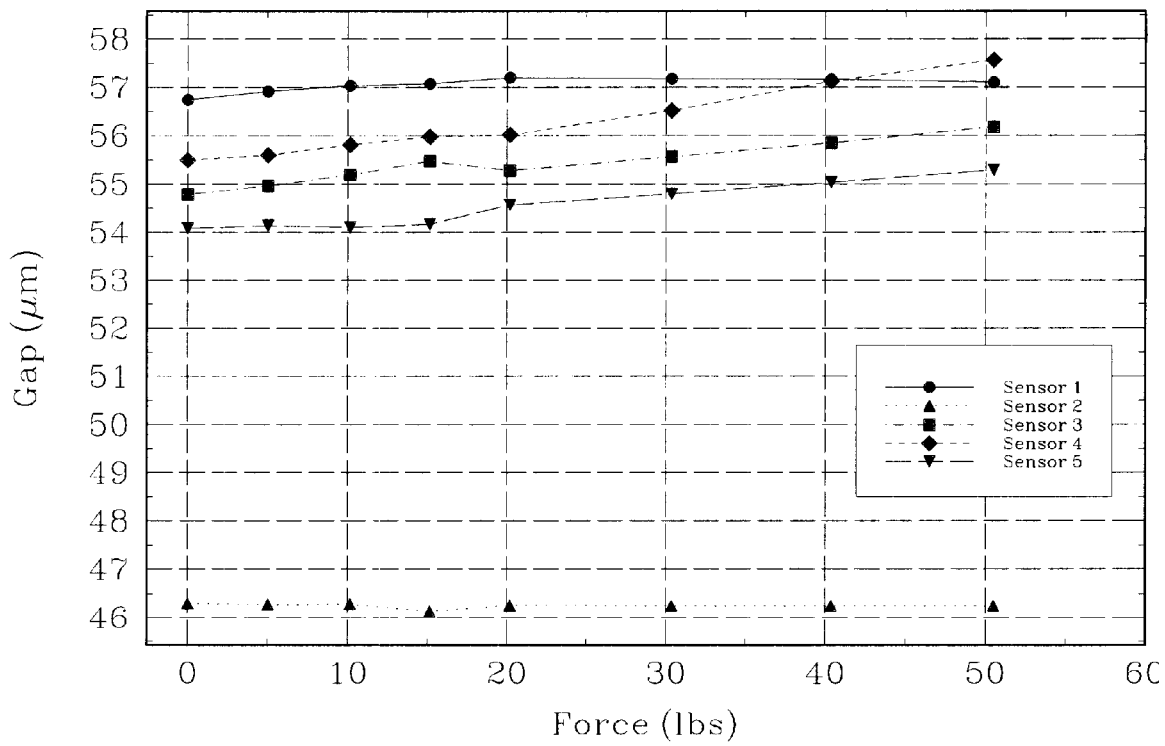
FIG. 19 is a graph illustrating the response of optical sensors for axial load case.
Figure 20:
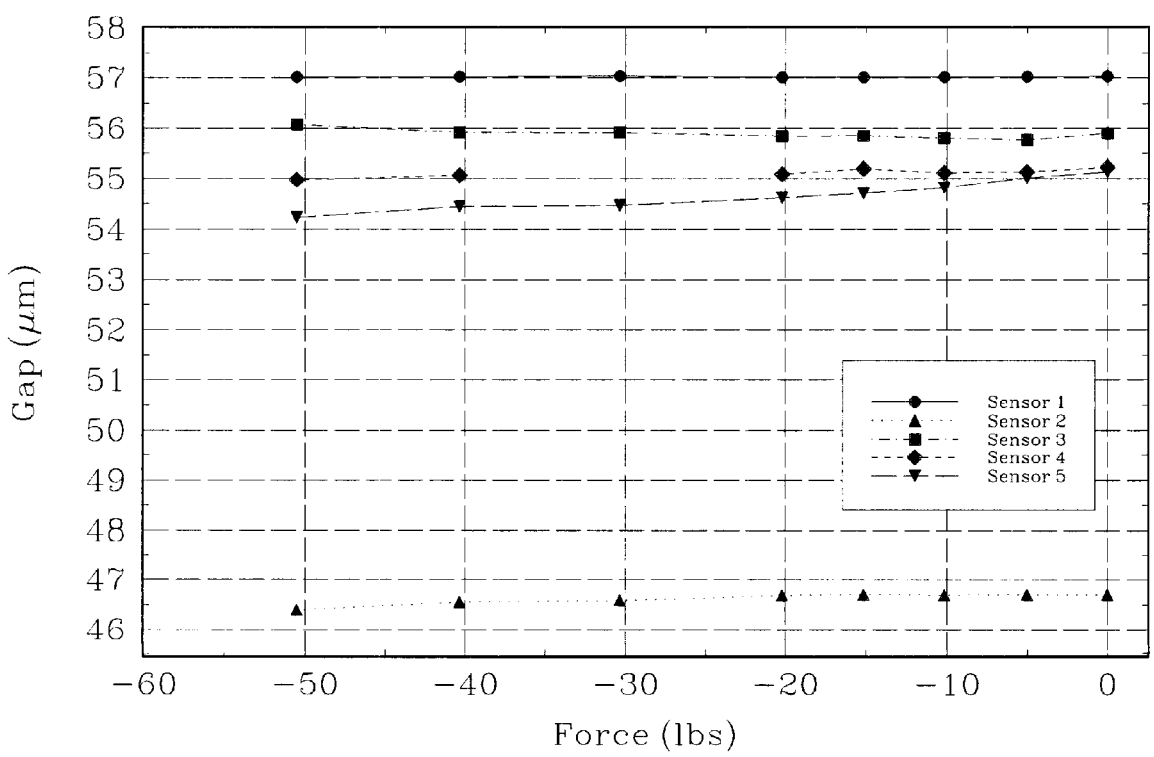
FIG. 20 is a graph illustrating the response of optical sensors for normal load case.
Figure 21:
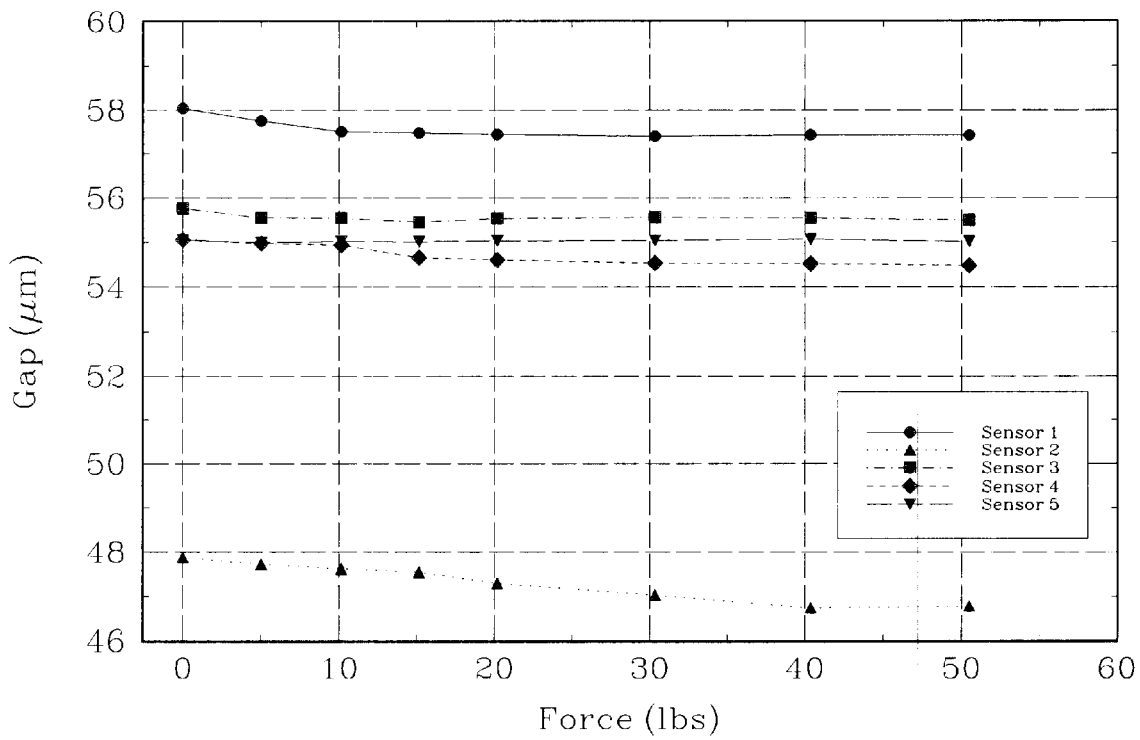
FIG. 21 is a graph illustrating the response of optical sensors for side load case.
Figure 22:
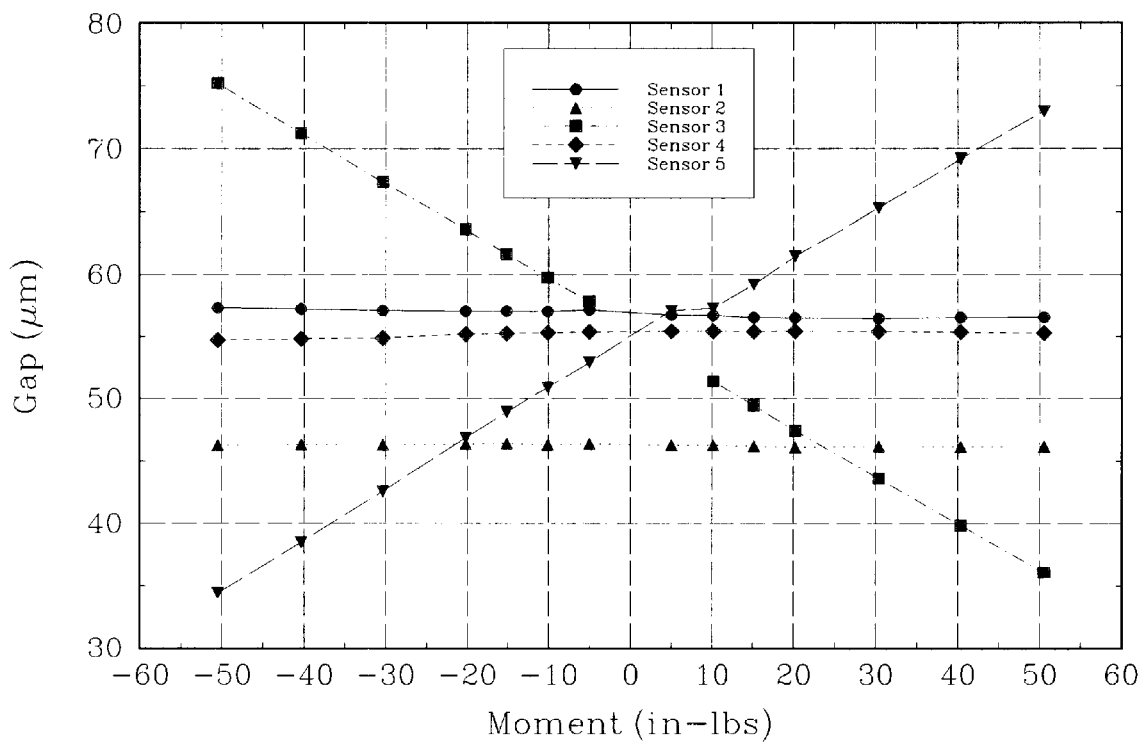
FIG. 22 is a graph illustrating the response of optical sensors for pitch moment load case.
Figure 23:
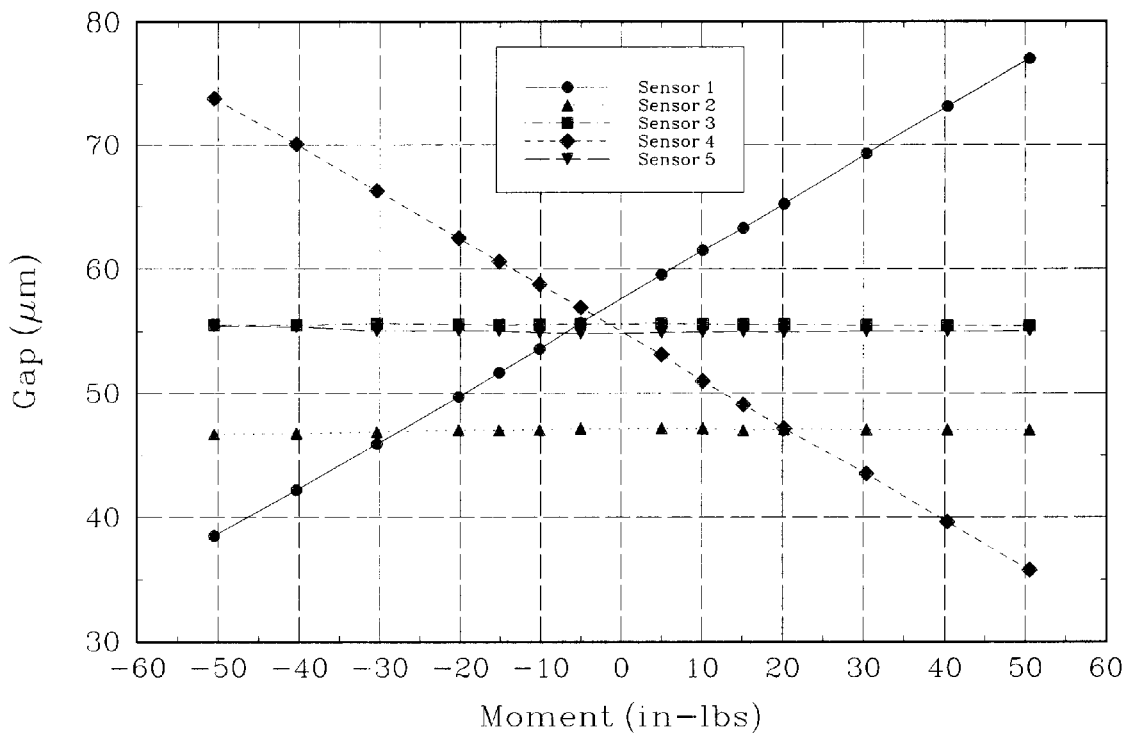
FIG. 23 is a graph illustrating the response of optical sensor for yaw moment load case.
Figure 24:
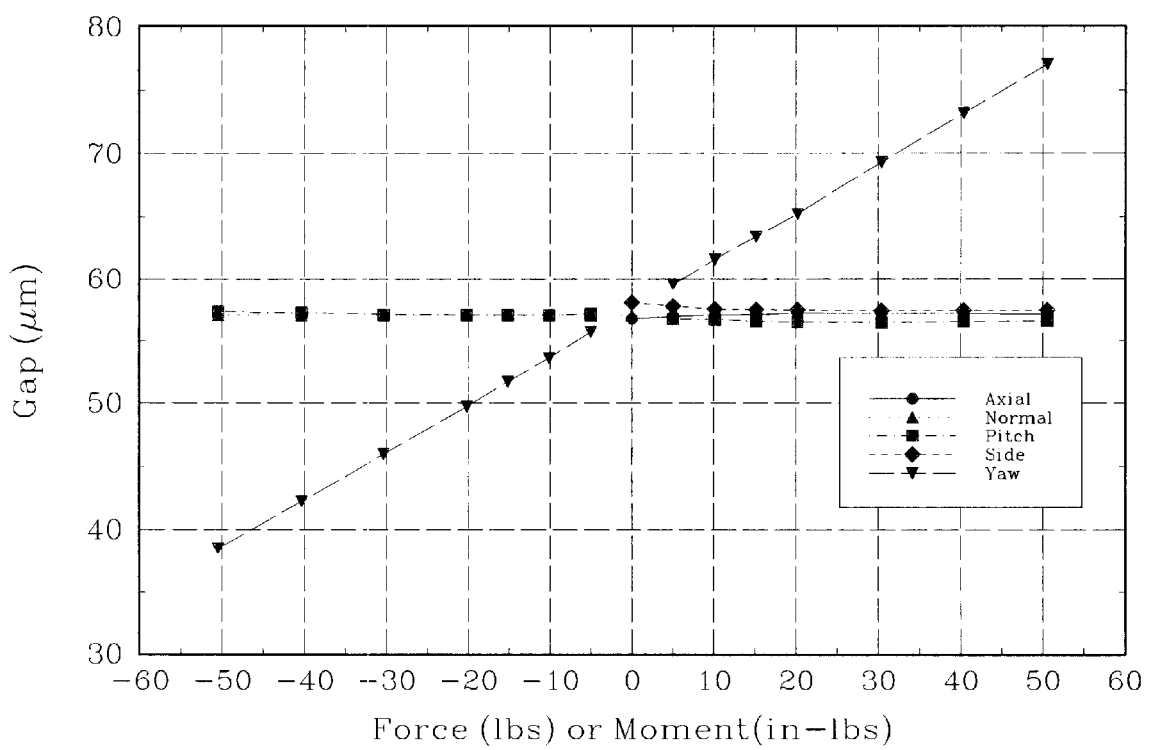
FIG. 24 is a graph illustrating the response of optical sensor #1 to the applied loads.
Figure 25:
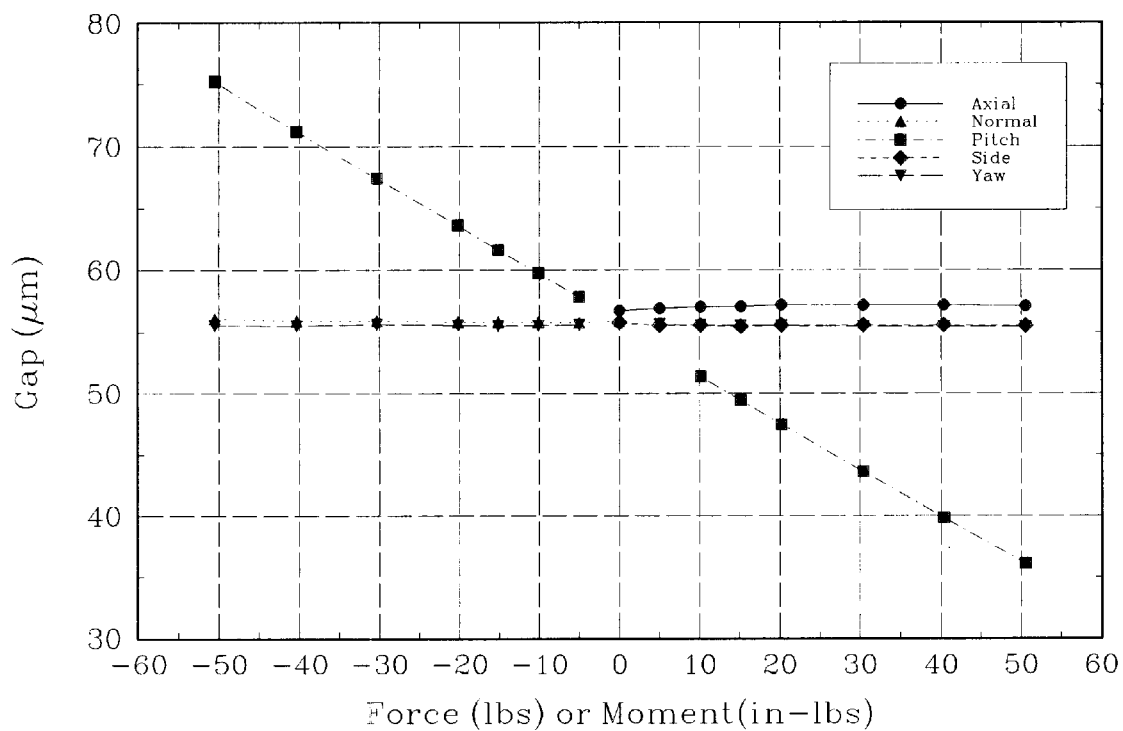
FIG. 25 is a graph illustrating the response of optical sensor #3 to the applied loads.
Figure 26:
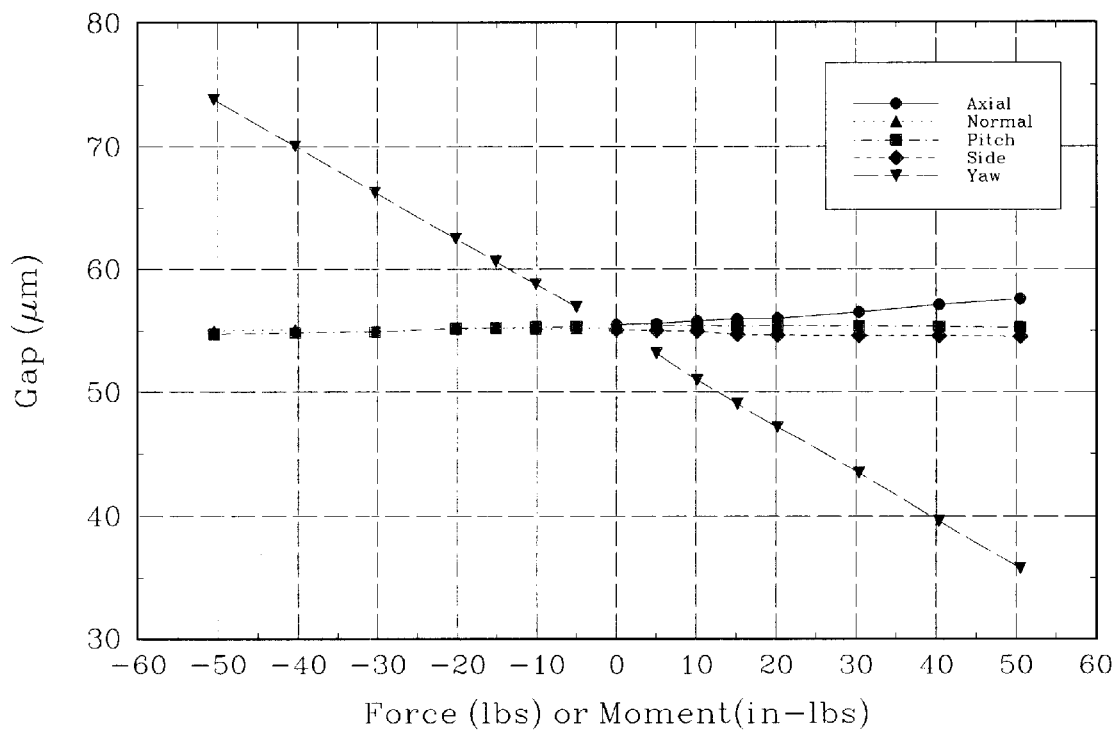
FIG. 26 is a graph illustrating the response of optical sensor #4 to the applied loads.
Figure 27:
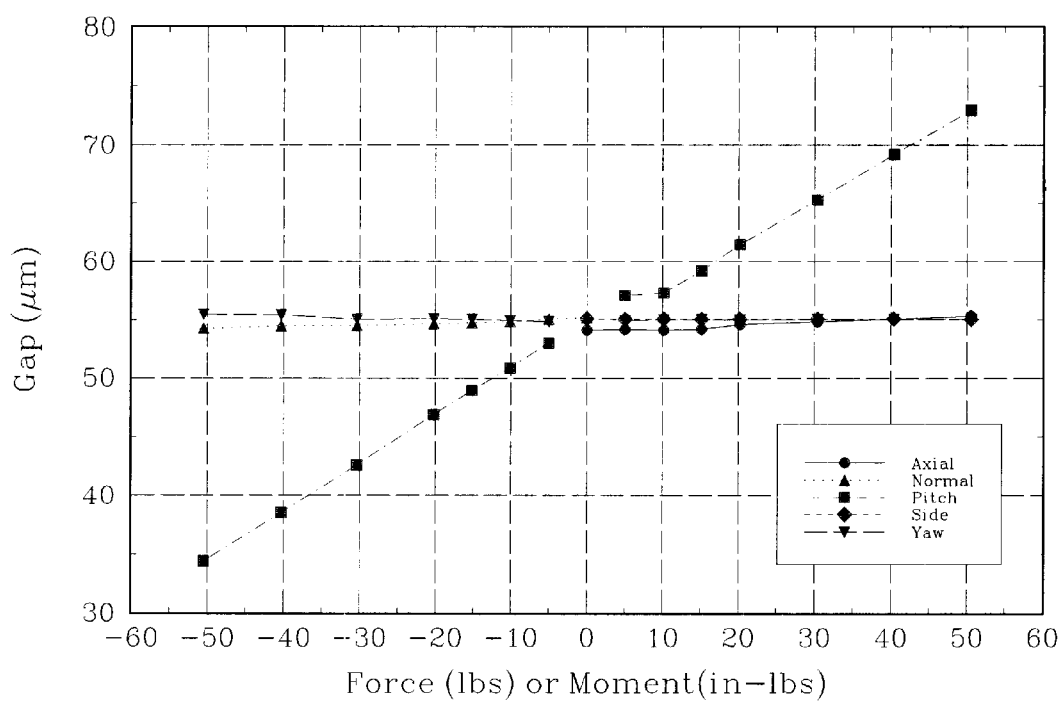
FIG. 27 is a graph illustrating the response of optical sensor #5 to the applied loads.
Figure 28A:
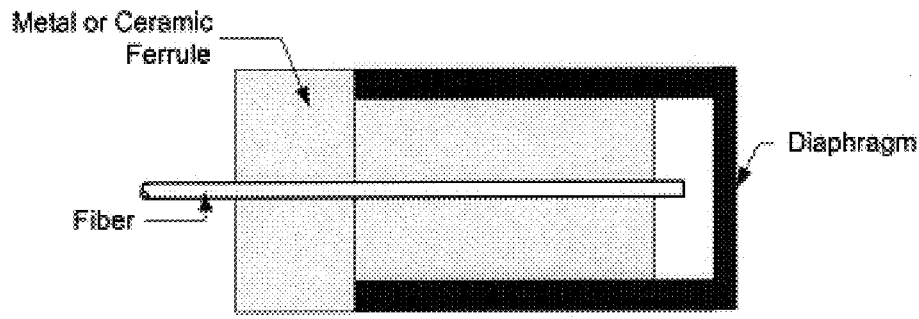
FIGS. 28a and 28b are exploded schematic views representing two of a number of possible pressure or temperature sensor configurations amenable to the disclosed displacement sensor technology.
Figure 28B:
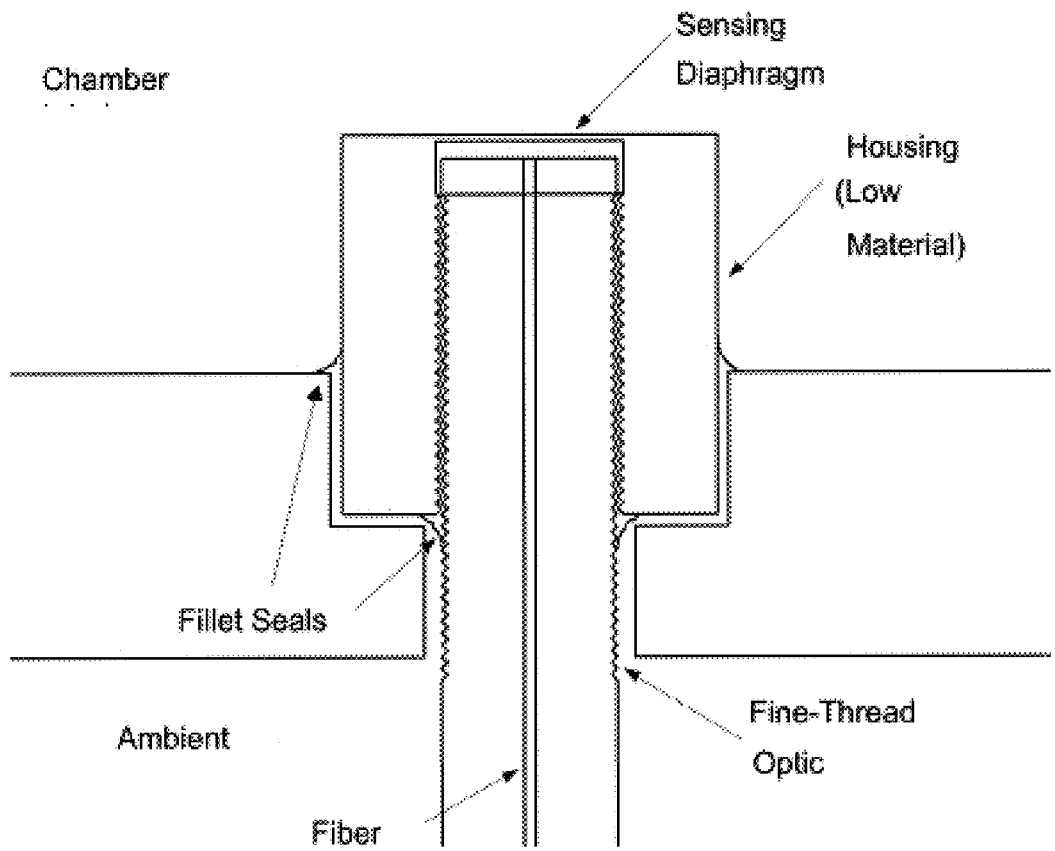
Figure 29:
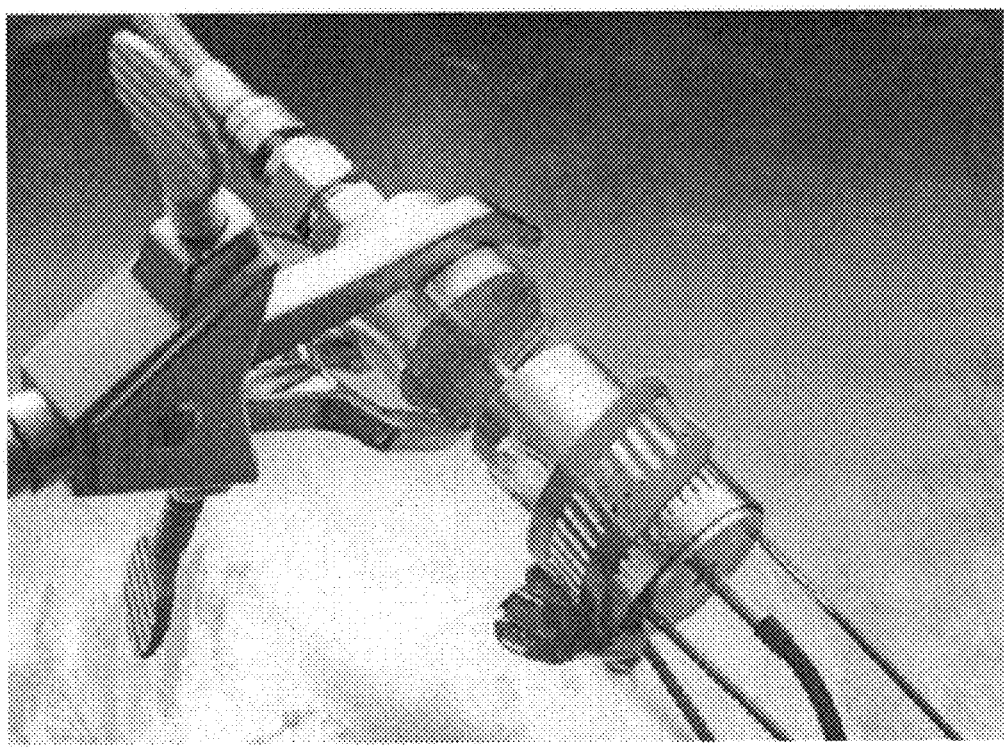
FIG. 29 provides top, side, and front elevational views of the load cell created to demonstrate the applicability of the disclosed technology to temperature and pressure sensing.
Figure 30:
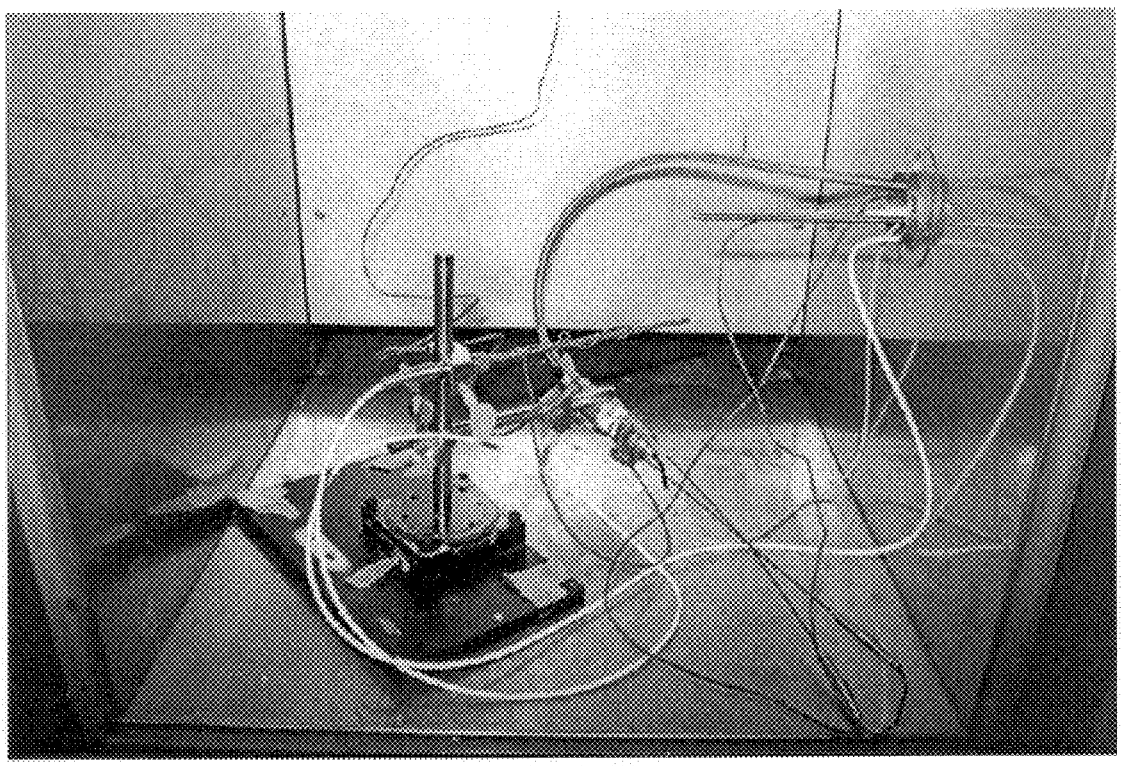
FIG. 30 is a photograph of the test fixture. Visible from the top is the high-pressure line; the fiber carrier and thermocouples enter from the lower right. The fiber carrier and fiber are barely visible at the center of the test fixture.

The balance was instrumented with five of the disclosed optical displacement sensors; four were located just above each and parallel to each post in the cage section, and one sensor was mounted perpendicular to the axis of the balance. FIG. 17 shows a schematic of the modified balance and the locations of the optical sensors. FIG. 18 shows the modified balance in the test rig a) for axial loads and b) for other loads: normal, side pitch and yaw. The load testing consisted of the following: 5, 10, 15, 20, 30, 40, and 50 lbs. in the negative axial force, negative normal force and positive side force directions. The moments consisted of 5, 10, 15, 20, 30, 40, 50 in-lbs for both positive and negative pitch and yaw. The listed loads are the nominal values. Only one optical subsystem was available during these tests, so each sensor had to be connected and disconnected for each load point.

The results of the load tests are shown below in FIG. 19 through FIG. 23. Note that although Sensor 2 was mounted incorrectly, this sensor does indicate the change due to thermal expansion during the tests. The highest sensitivity was shown by the pitching and yaw moments. With the thermal expansion taken into account, the configuration of the optical sensors shows a high degree of isolation to the side and normal forces, therefore minimizing the interactions due to these forces. This is one of the key advantages of this optical displacement sensing technology.

The individual sensor responses are shown in FIG. 24 through FIG. 27. These sensors mainly responded to the loading moments, with a high degree of isolation from normal and side forces. Sensors 1, 3, 4 and 5 showed a small sensitivity to the axial load. There appears to be some small moments generated in this loading configuration. It is believed that this is due to the nature in which the weights were suspended.

These results attests to one of the key advantages of the fiber optic displacement sensor: the sensor is not under strain and thus, the strain does not need to be concentrated in a small region to achieve high accuracy, as is done with foil-strain gage based force balance systems. The estimated accuracy for the pitch and yaw moments are approximately 0.1% of full-scale applied load, which in this case was half the design load.

To reiterate and expand upon advantages of the disclosed fiber optic displacement sensor technology over foil and/or semiconductor based strain gages for force balance instrumentation are:

1) The sensors are small, with one embodiment less than 250 $\mu$m in diameter,
2) The measured displacement is the integral of strain over the sensing length, therefore there is higher sensitivity,
3) This increase in sensitivity permits stiffer balances,
4) The optical configuration can be tailored to meet various requirements in dynamic range and accuracy,
5) The optical sensors are not under strain; therefore there is no hysteresis due to the sensor,
6) Cross-axis interactions can be minimized or eliminated depending upon design,
7) The EMI immunity of the sensor and its transmission media are ideal for high EMI/RFI environments, and
8) The sensor system requires no co-located signal conditioning equipment, thus long distances between the sensors and their support systems are possible. This translates into potential cost savings.

Application Four: Pressure or Temperature Sensing

Figure 31:
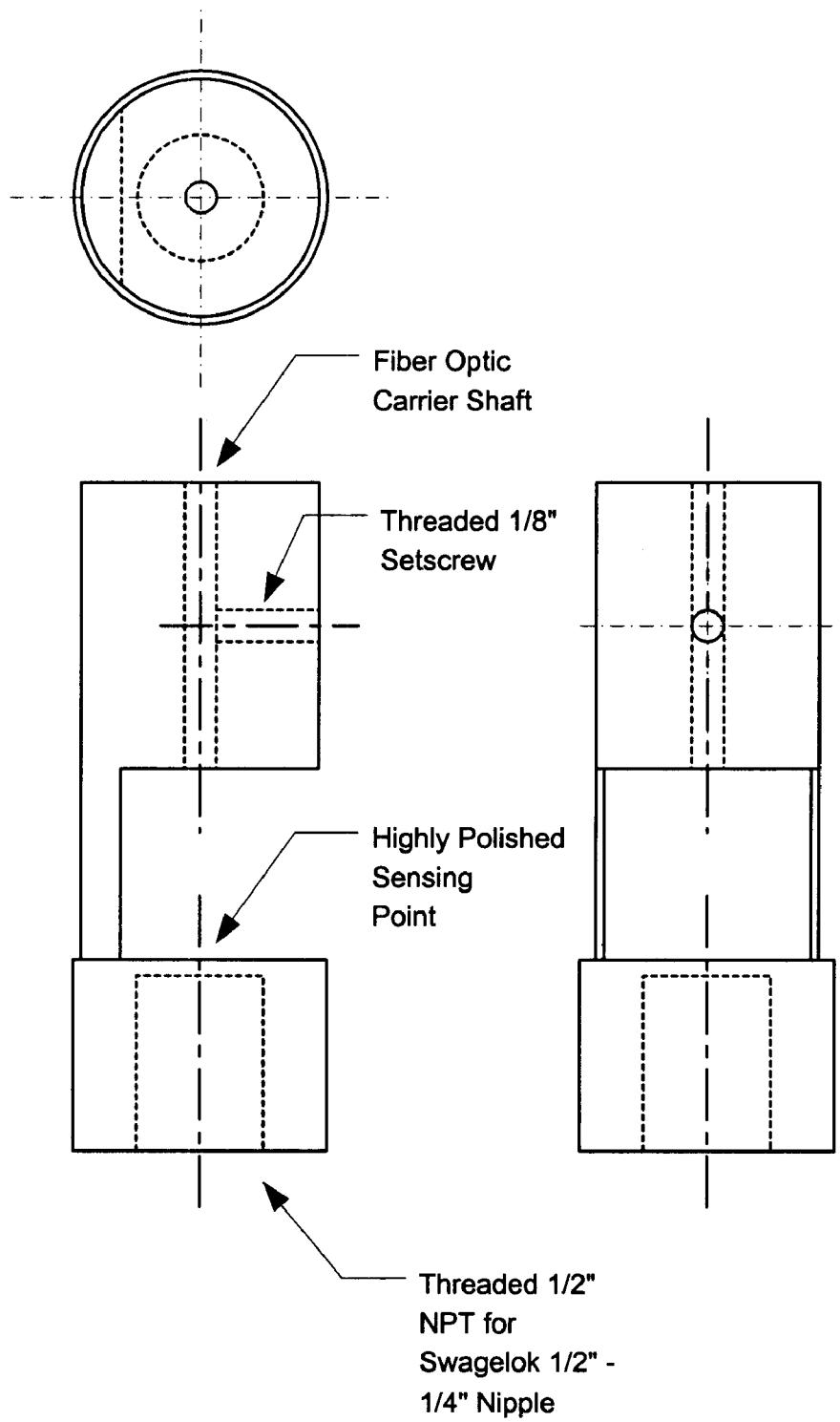
FIG. 31 is a photograph of the test fixture and sensors within the temperature chamber. Shown are the RTDs used to monitor the free-stream oven temperature, the test fixture with the thermocouple's (TC) used to monitor the surface temperature of the test fixture (load cell), the fiber optic lead, and the high-pressure line from the PSI regulator

FIG. 31 shows a three-view drawing of the test cell used to demonstrate the applicability of the disclosed technology for pressure and temperature sensing. The device consists of two cylindrical areas joined with a solid rib; the top area is drilled through to accept a ⅛" fiber optic carrier and the bottom is milled to within 3.0 mm of the middle surface to form a diaphragm. The fiber is mounted to an aluminum carrier with cyanoacrylate, inserted in the top section, and secured in place with a set-screw once the standoff distance of the fiber sensor has been established. The bottom section is threaded and is connected to a Pressure systems pressure controller that regulates the setpoint pressure in the test fixture, keeping it constant to ±0.05% psia full-scale. With a diameter of ½" the surface area of the diaphragm is almost 127 mm², combined with a pressure range of ambient to 500 psia the resulting forces produced are nearly 437 Newtons (98 lbf). Design calculations for the test fixture were based upon NASA Technical Brief GSC-13783, which details the calculation of a deflection of a circular membrane under differential pressure. In general, given Young' modulus E for aluminum, (~82 GPa @ 293° K), Poisson's ratio v (0.345 @ 293° K), the diaphragm thickness h (~3 mm), and the full-scale differential pressure q (~500 psi) the out-of plane deflection $w_o(h)$ can be calculated from the following expression:

$$\omega_o(h) := \alpha \cdot a \cdot \sqrt[3]{\frac{(q \cdot a)}{E \cdot h}}$$

where α is a value based upon Poisson's ratio and is given as expression (10) in the technical brief. The end result is that the predicted displacement is on the order of 19 μm full-scale.

In this particular case a rib connects the fiber pathway to the edge of the diaphragm, causing the configuration to be much stiffer than expected (see FIG. 31). The device under test (DUT) consisted of two resistive temperature devices (RTDs) and two thermocouples (TCs) were used to monitor both the free-stream temperature as well as the surface temperature of the test fixture in the chamber. The RTDs were placed in the free stream of the temperature chamber and the TCs were attached to the surface of the test fixture with thermal compound. The fiber sensor was positioned to less than 90 μm of the sensing surface and secured in place.

Figure 32:
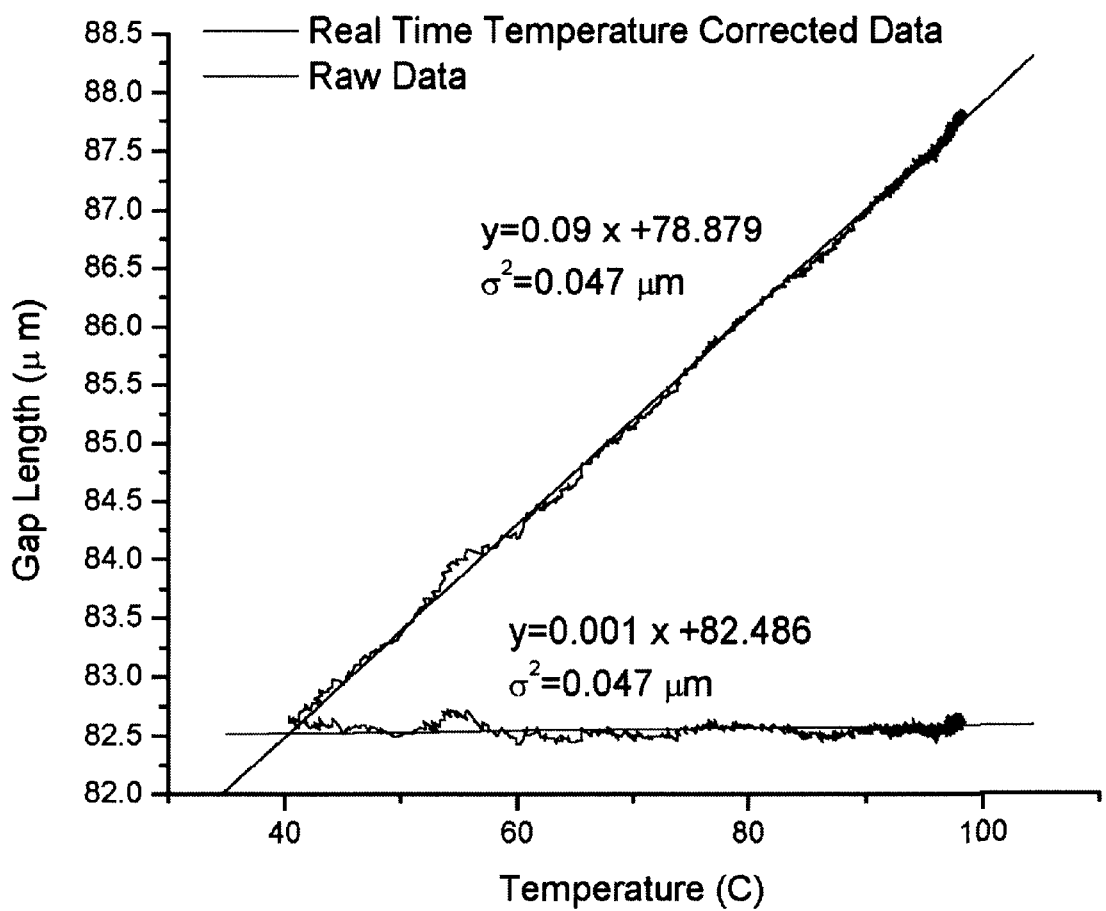
FIG. 32 is a graph illustrating real-time correction for thermal expansion upon heating (dl/dT=0.09 um/C).

In reference to temperature sensing, refer to FIG. 32. Indicated are two plots of the same time series. The diagonal plot is the raw expansion data of the test cell as its temperature was ramped from 40° C. to 100° C. (104° F. to 212° F.), and shows that under constant load the test cell experiences a thermal expansion of nearly 90 nm/° C. change with an effective standard deviation of 47 nm across the entire temperature range (i.e. a temperature sensor [dl×dT/dl=dT]). Not indicated is the coefficient of determination $R^2$ that is typically >0.99 across all like data sets. The total displacement change is 5.4 μm; using the standard deviation as the measurement resolution this equates to 0.87% of the full-scale value.

The second trace is the same expansion data but compensated with respect to temperature changes. Specifically, once the thermal expansion of the test fixture was determined in prior (but equivalent) tests, a linear correction factor was applied to the expansion data in real-time to produce the horizontal plot shown in the same graph. The result is a nearly horizontal trace independent of changes in temperature.

Figure 33:
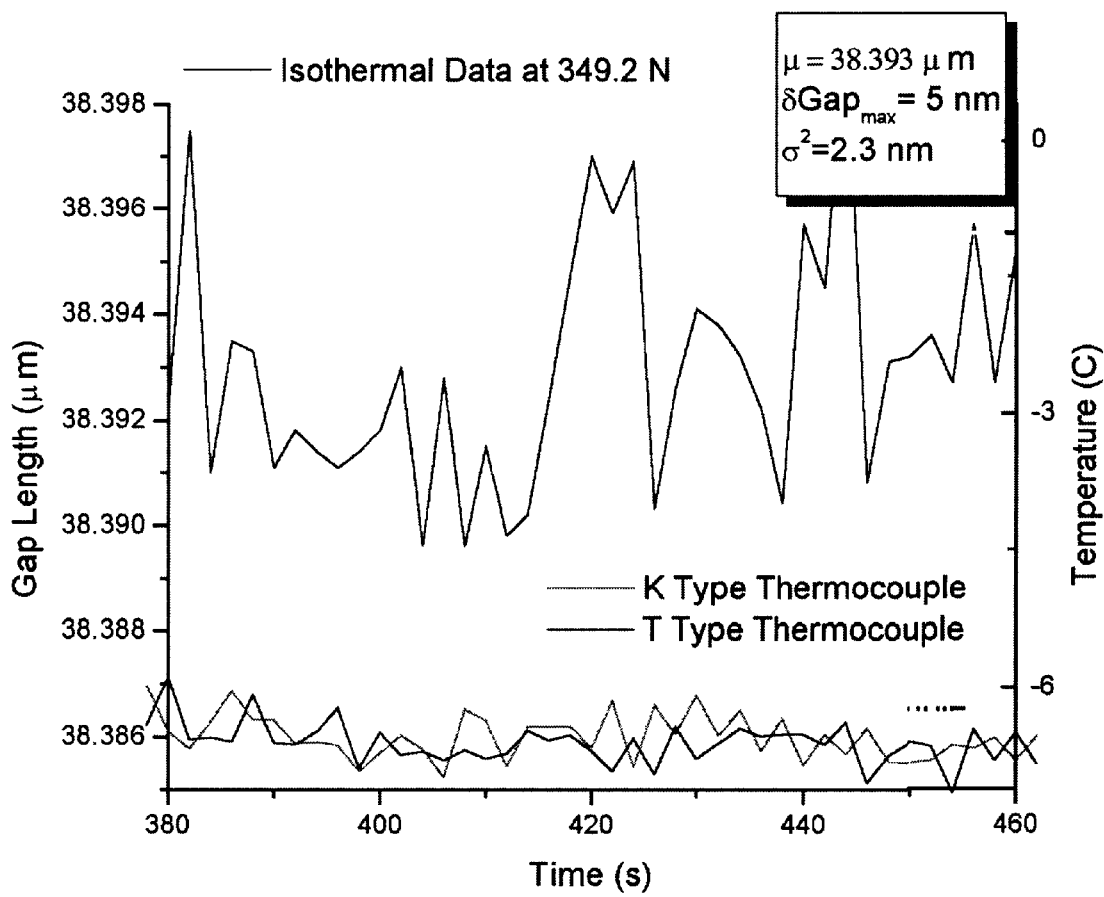
FIG. 33 is a graph illustrating the resolution of the system at a load of 349.2 N and a constant temperature of −6° C. The resolution is 2.3 nm and the measurement uncertainty of the system is approximately ±5 nm. Error is attributed to random intensity noise in the source and thermal noise in the opto-electronic conversion process.

FIG. 33 shows a condition where the system is loaded to 349.2 N (constant) and temperature is held constant at approximately −6.5° C. Approximately 80 points are indicated. The purpose of this graphic is to demonstrate the stability of the temperature probe given a constant pressure and temperature. As indicated, the mean gap measured by the fiber optic sensor is 38.393 μm with a standard deviation of 2.3 nm. Overall noise in the system contributed to a maximum measurement uncertainty of 10 nm peak to peak, or equivalently, 0.11° C. Note that this is far more stable than the TC data shown.

FIG. 39 shows the results of ramping the load while holding the temperature constant at different levels. Note that the sensor is able to detect the modulus of the material changing as temperature changes as evidenced by the changing slopes of each regression line. In other words, the same change in pressure gives rise to a larger gap change due to an increase in the compliance (1/E).

Figure 34:
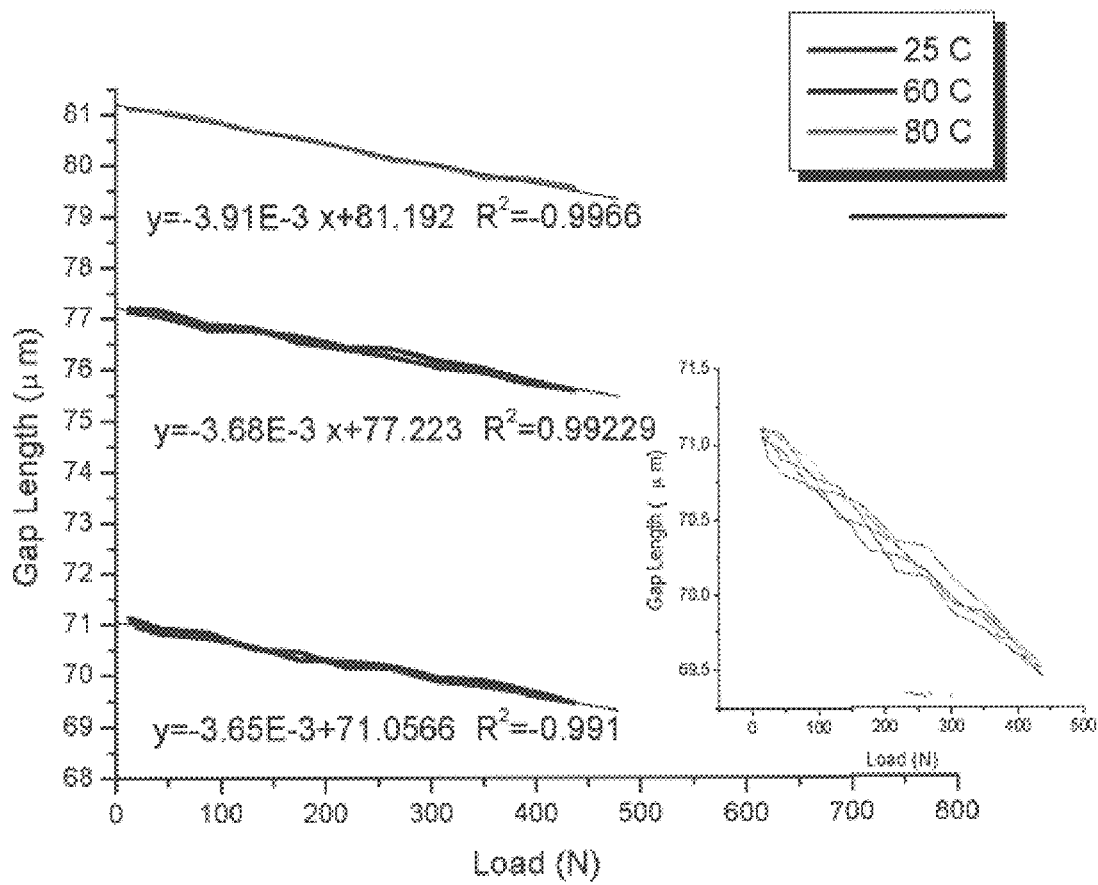
FIG. 34 is a graph illustrating gap length as a function of pressure at various temperatures. Notice that the change in modulus(E) due to temperature is evidenced by the increasing slope of □Gap/□P.

The inset graph shown in FIG. 34 is the real-time temperature-corrected load data. The purpose of this graphic is to show that that through knowledge of the temperature dependence of the modulus and on-board temperature compensation it is possible to generate on-the-fly, real time temperature corrected load data.

Figure 35:
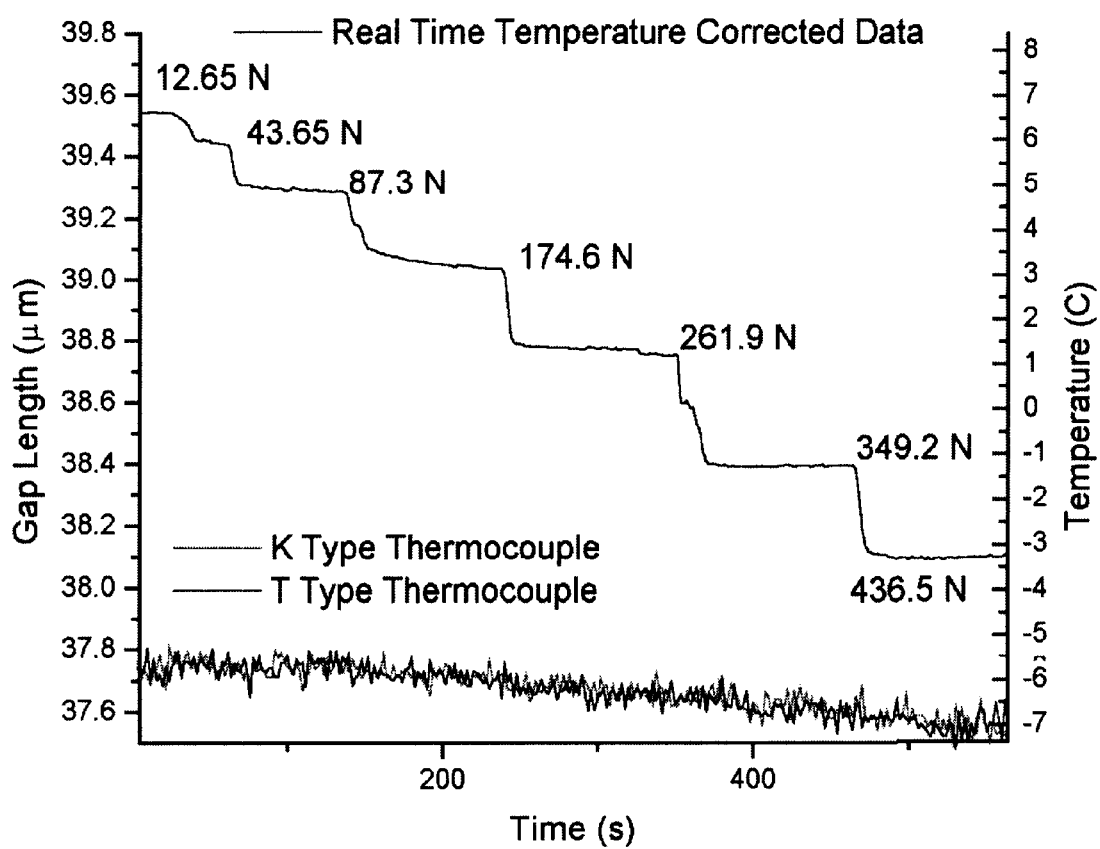
FIG. 35 is a graph illustrating the system in run-time mode. The load is varied over 400 N at discrete time intervals.

Finally, FIG. 35 shows the run-time operation of the system in the presence of varying loads and slightly decreasing temperature. Data is being corrected for temperature in accordance with the data presented in FIG. 32. The discrete levels shown were read from a standard dial-type pressure regulator gage and correspond to pressure levels of 15 psi, 50, 100, 200, 300, 400, and 500. The change in vertical sensitivity as a function of increasing load is thought to stem from gage non-linearity, especially at low-pressure readings.

The purpose of FIG. 35 is to demonstrate the quality of the fiber sensor signal in the presence of varying loads. The noise component is extremely small, even though there is limited dynamic range in the diaphragm.

Application Five: Magnetic Field Sensing

Figure 36A:
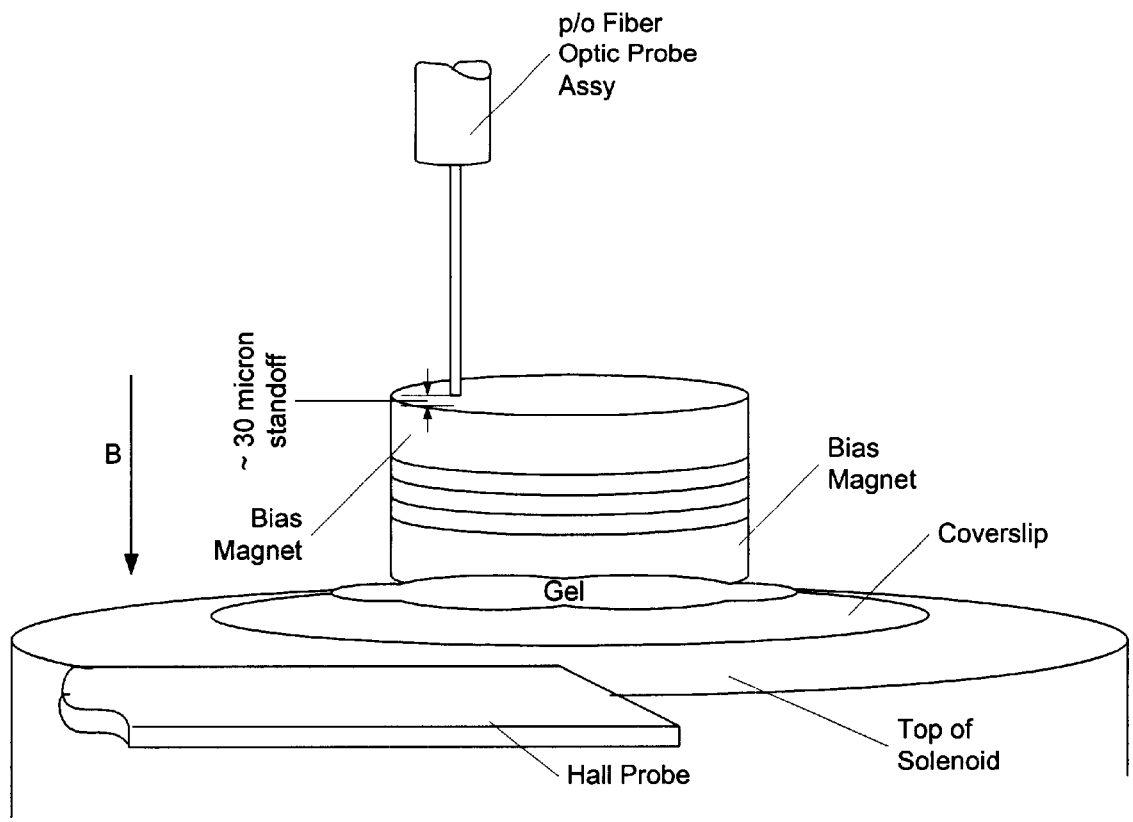
FIG. 36 is a graph illustrating of magnetic field sensing using the disclosed sensor technology. The test configuration used is shown in the upper graphic and is not meant to limit the number of realizable configurations applicable to the proposed technology.
Figure 36B:
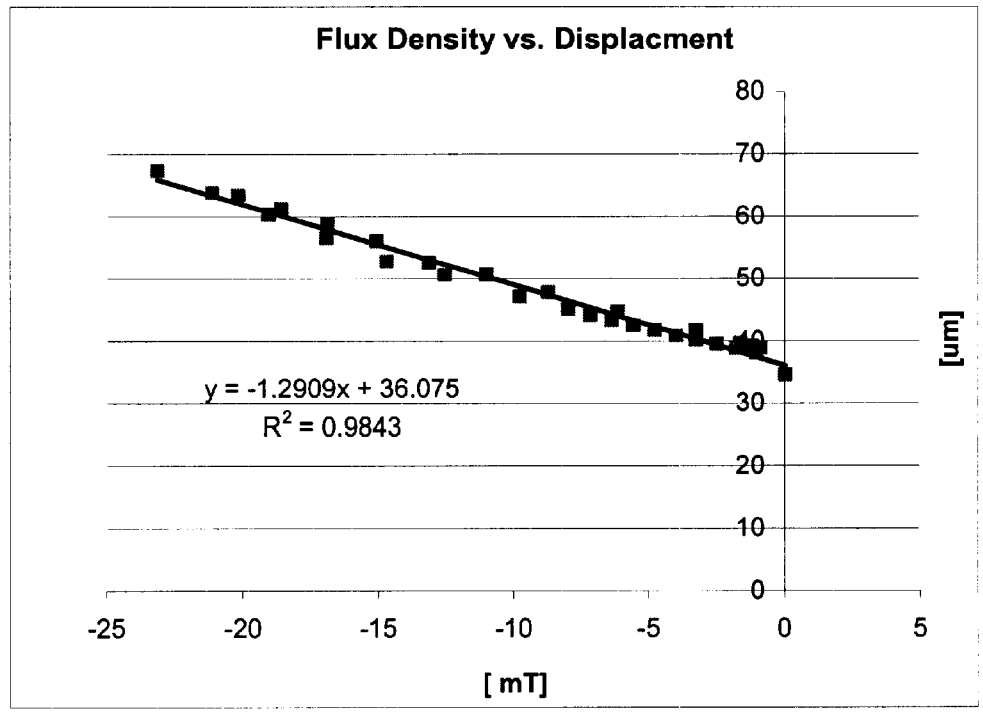

Magnetic field sensing has been demonstrated with the disclosed technology (see FIG. 36). The principle of operation is based upon the use of magnetostrictive materials which deform in a known manner in the presence of magnetic fields. These materials contract or expand in an applied field, often without hysteresis. The nanometer resolution of the disclosed invention allows precise characterization of the peak intensity of the magnetic field component axially aligned with the probing fiber.

Application Five: Acoustic Sensing

Acoustic sensing has been demonstrated with the disclosed technology. The principle of operation is based upon the use of the aforementioned pressure sensor technology with a modified diaphragm which is sensitive to an acoustic pressure front.

Figure 37:
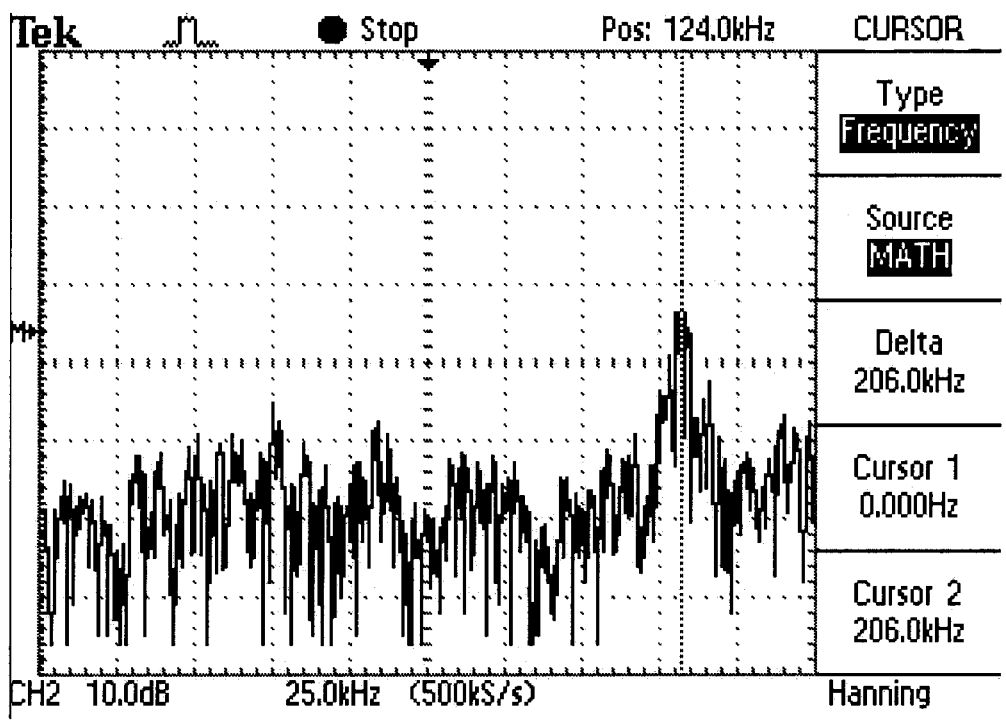
FIG. 37 is a graph illustrating frequency spectra from the Harisonic Labs Model G 0504, DC-5 MHz PZT. Note that the main frequency peak detected here is the same as was detected in FIG. 38. Also, note the slight increase in power spectral density from about 25 kHz through 75 KHz, which is corroborated in the fiber optic spectra.
Figure 38:
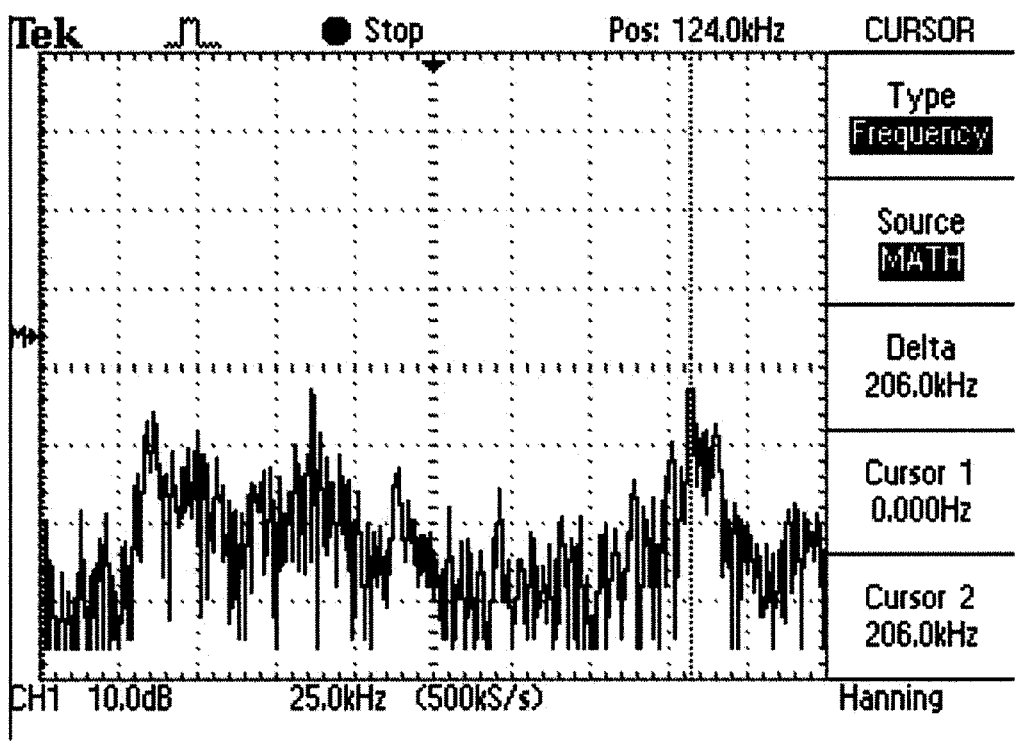
FIG. 38 is a graph illustrating frequency spectra from the fiber optic partial discharge sensor. The bandwidth of the amplifier is 20 KHz to 250 KHz, which accounts for the apparent roll-off at these frequencies.

FIG. 37 and FIG. 38 show representative data in the frequency domain during a typical acoustic event. The two graphs reveal that the primary power component in the signal detected at 206 KHz.

APPENDIX A

AFOS-CPY.C

```c
#include <analysis.h>
#include <userint.h>
#include "includes.h"
#include "nasa.h"
void vAfss(int N, double dNu[], double dIntensity[], double *dGapCalc)
{
    double    dC=3.0e8,/* Speed of Light */
              dGap[2051],
                    dMag[2051],
                    dM11,
                    dM12,
                    dM21,
                    dM22,
                    dV1,
                    dV2,
                    dSlope,
                    dOffSet,
                    dPhase[2051],
                    dPi,
                    dPix[2051],
              dRe[2051],
              dIm[2051],
              dRe1[2051],
              dIm1[2051];
    int i,
              j;
    dPi = 4.0*atan(1.0);
    N=600;
    for (i=0; i<N; i++) {
        dMag[i] =0.0;
        dIntensity[i] = dIntensity[100+i]*(0.5 - 0.5*cos(2.0*dPi*(double) i/ (double) N));
    }
    for (i=70; i<N; i++) {
        dPix[i] = (double) i;
        dGap[i] = (double) i * 0.5e-6;
        dRe[i] = 0.0;
        dIm[i] = 0.0;
        for (j=0; j<N; j++) {
            dRe[i] += dIntensity[j] * cos(2.0*dPi*dGap[i]*dNu[j]/dC);
            dIm[i] += dIntensity[j] * sin(2.0*dPi*dGap[i]*dNu[j]/dC);
        }
    }
    for (i=0; i<70; i++) {
        dRe[i] = 0.0;
        dIm[i] = 0.0;
    }
    for (i=0; i<N; i++) {
        dRe1[i] = 0.0;
        dIm1[i] = 0.0;
        for (j=70; j<N; j++) {
            dRe1[i] += dRe[j]*cos(2.0*dPi*dGap[j]*dNu[i]/dC) +
dIm[j]*sin(2.0*dPi*dGap[j]*dNu[i]/dC);
            dIm1[i] += dRe[j]*sin(2.0*dPi*dGap[j]*dNu[i]/dC) -
dIm[j]*cos(2.0*dPi*dGap[j]*dNu[i]/dC);
        }
        dPhase[i] = atan2(dIm1[i], dRe1[i]);
    }
    vUnwrapPhase( N, dPhase);
    dM11 = 0.0;
    dM12 = 0.0;
    dM21 = dM12;
    dM22 = 0.0;
    dV1 = 0.0;
    dV2 = 0.0;
    for (i=150; i<450; i++) {
        dM11 += dNu[i]*dNu[i];
        dM12 += dNu[i];
        dM22 += 1.0;
        dV1 += dNu[i]*dPhase[i];
        dV2 += dPhase[i];
    }
    dM21 = dM12;
    dSlope = (dV1 - dV2*dM12/dM22)/(dM11 - dM12*dM21/dM22);
    *dGapCalc = dSlope *dC / (4.0*dPi) * 1.0e6;
}
```

INCLUDES-CPY.H

```c
#include <stdlib.h>
#include <stdio.h>
```

APPENDIX A-continued

```
#include <math.h>
#include <utility.h>
#include <userint.h>
#include <ansi_c.h>
                            NASA-CPY.C
#include <utility.h>
#include <analysis.h>
#include <userint.h>
#include <ansi_c.h>
#include "spec.h"
#include "swdll.h"
#include "nasa.h"
static int hMainPanel;
int CVICALLBACK maincb(int panel, int control, int event, void *callbackData, int
eventData1, int eventData2);
static int iStart = 0,
                            iZero=0;
double *dWavelength,
                            *dIntensity,
                            *dNu,
                            dGap,
                            dZeroGap,
                            *dGaps,
                            dGaps0=0.0,
                            dGaps1=0.0,
                            dGaps2=0.0,
                            dGaps3=0.0,
                            dGaps4=0.0,
                            dGaps5=0.0,
                            dGaps6=0.0,
                            dGaps7=0.0,
                            dGaps8=0.0,
                            dGaps9=0.0;
float    *buffer,
                            **ptr;
main(int argc, char* argv[])
{
    if (InitCVIRTE(0,argv,0) == 0) {
        printf("Out of memory");
        return(-1); //out of memory
    }
            InstallMainCallback ( maincb, 0, 1);
            SetIdleEventRate(50);
            srand (Timer());
            if ((hMainPanel = LoadPanel (0, "spec.uir", MAINPANEL)) < 0 ) {
                printf("Panel Not Loaded \n");
                exit(-1);           //panel not loaded
            }
            vInitSpec();
            DisplayPanel(hMainPanel);
            RunUserInterface();
            SWDclose();
}
int CVICALLBACK maincb(int panel, int control, int event, void *callbackData, int
eventData1, int eventData2)
{
            if ((event == EVENT_IDLE) && (iStart == 1)) {
                vSpectrum( hMainPanel, MAINPANEL_GRAPH);
            }
            return(0);
}
int CVICALLBACK quitcb(int panel, int control, int event, void *callbackData, int
eventData1, int eventData2)
{
            if (event==EVENT_COMMIT)
            {
                QuitUserInterface(0);
                if (iStart == 1)
                    vFreeMem();
            }
            return(0);
}
int CVICALLBACK startcb(int panel, int control, int event, void *callbackData, int
eventData1, int eventData2)
{
            if (event==EVENT_COMMIT)
                iStart = 1;
            return(0);
}
```

APPENDIX A-continued

```
void vInitSpec()
{
            int N=2051,
                i;
            buffer = (float *) calloc ( N, sizeof(float));
            ptr = &buffer;
            dGaps = (double *) calloc ( 10, sizeof(double));
            if (dGaps == NULL) {
                printf ("Not enough memory\n");
                exit(0);
            }
            for (i=0; i<9; i++) {
                dGaps[i] = 0.0;
            }
            dWavelength = (double *) calloc ( N, sizeof(double));
            if (dWavelength == NULL) {
                printf ("Not enough memory\n");
                exit(0);
            }
            dIntensity = (double *) calloc ( N, sizeof(double));
            if (dIntensity == NULL) {
                printf ("Not enough memory\n");
                exit(0);
            }
            dNu = (double *) calloc ( N, sizeof(double));
            if (dNu == NULL) {
                printf ("Not enough memory\n");
                exit(0);
            }
            for (i=1024; i<2048; i++) {
                dWavelength[i-1024] = 0.0000113*(double)i*(double)i +
0.187255*(double)i + 542.38;
                dNu[i-1024] = 3.0e8 / (dWavelength[i-1024] * 1.0e-9);
            }
            SWDinit();
            LoadExternalModule ("swdll.lib");
}
void vSpectrum( int hPanel, int hControl)
{
            int     N=2051,
                    i,
                    j,
                    ID,
                    error,
                    status,
                    iPlotHandle,
                    iPanelHandle,
                    iControlID;
            double  dGapAvg,
                    dGapSdv,
                    dDeltaGap,
                    dForce,
                    dMax,
                    dMin;
            do {
                error = SWDscan( 1, ptr);
            } while (error != 0);
            dMax = -99999.0;
            dMin = 99999.0;
            for (i=1024; i<2048; i++) {
                j = i - 1024;
                dIntensity[j] = (double) buffer[i];
                if (dIntensity[j] > dMax) dMax = dIntensity[j];
                if (dIntensity[j] < dMin) dMin = dIntensity[j];
            }
            RefreshGraph (hPanel, hControl);
            iPlotHandle = PlotXY (hPanel, hControl, dWavelength,
                            dIntensity, 1024, VAL_DOUBLE,
VAL_DOUBLE,
                            VAL_THIN_LINE, VAL_NO_POINT,
VAL_SOLID,
                            1, VAL_RED);
            DeleteGraphPlot (hPanel, hControl, -1, VAL_DELAYED_DRAW);
            for (i=1024; i<2048; i++) {
                j = i - 1024;
                dIntensity[j] = (dIntensity[j] - dMin) / (dMax - dMin);
            }
            vAfss( 1024, dNu, dIntensity, &dGap);
            SetCtrlVal (hPanel, MAINPANEL_NUMERIC_GAP, dGap);
```

APPENDIX A-continued

```
                dDeltaGap = dGap - dZeroGap;
                dForce = 1.0578*dDeltaGap;
                if (iZero > 0) {
                        SetCtrlVal (hPanel, MAINPANEL_NUMERIC_DELTA_GAP,
dDeltaGap);
                        SetCtrlVal (hPanel, MAINPANEL_NUMERIC_FORCE, dForce);
                }
                dGaps0 = dGaps1;
                dGaps1 = dGaps2;
                dGaps2 = dGaps3;
                dGaps3 = dGaps4;
                dGaps4 = dGaps5;
                dGaps5 = dGaps6;
                dGaps6 = dGaps7;
                dGaps7 = dGaps8;
                dGaps8 = dGaps9;
                dGaps9 = dGap;
                dGaps[0] = dGaps0;
                dGaps[1] = dGaps1;
                dGaps[2] = dGaps2;
                dGaps[3] = dGaps3;
                dGaps[4] = dGaps4;
                dGaps[5] = dGaps5;
                dGaps[6] = dGaps6;
                dGaps[7] = dGaps7;
                dGaps[8] = dGaps8;
                dGaps[9] = dGaps9;
                StdDev (dGaps, 10, &dGapAvg, &dGapSdv);
printf("%f%f\n", dGapAvg, dGapSdv);
}
void vFreeMem( void)
{
                free(dIntensity);
                free(dWavelength);
}
int CVICALLBACK zerocb (int panel, int control, int event,
                void *callbackData, int eventData1, int eventData2)
{
                switch (event)
                        {
                        case EVENT_COMMIT:
                                dZeroGap = dGap;
                                iZero = 1;
                                SetCtrlAttribute (panel,
MAINPANEL_NUMERIC_DELTA_GAP, ATTR_VISIBLE,
                                        1);
                                SetCtrlAttribute (panel,
MAINPANEL_NUMERIC_DELTA_GAP, ATTR_DIMMED,
                                        0);
                                SetCtrlAttribute (panel, MAINPANEL_NUMERIC_FORCE,
ATTR_VISIBLE,
                                        1);
                                SetCtrlAttribute (panel, MAINPANEL_NUMERIC_FORCE,
ATTR_DIMMED,
                                        0);
                                break;
                        }
                return 0;
}
                                NASA-CPY.H
void vInitSpec( void);
void vSpectrum(int hPanel, int hControl);
void vFreeMem( void);
void vAfss(int N, double dNu[], double dIntensity[], double *dGapCalc);
void vUnwrapPhase(int N, double dPhase[]);
                                SPEC-CPY.H
/********************************************************************
***/
/* LabWindows/CVI User Interface Resource (UIR) Include File      */
/* Copyright © National Instruments 1999. All Rights Reserved.    */
/*                                                                */
/* WARNING: Do not add to, delete from, or otherwise modify the contents */
/*          of this include file.                      */
/********************************************************************
***/
#include <userint.h>
#ifdef __cplusplus
    extern "C" {
#endif
```

APPENDIX A-continued

```
/* Panels and Controls: */
#define MAINPANEL                   1
#define MAINPANEL_STARTBUTTON       2    /* callback function: startcb */
#define MAINPANEL_QUITBUTTON        3    /* callback function: quitcb */
#define MAINPANEL_NUMERIC_FORCE     4
#define MAINPANEL_NUMERIC_DELTA_GAP 5
#define MAINPANEL_NUMERIC_GAP       6
#define MAINPANEL_GRAPH             7
#define MAINPANEL_ZEROBUTTON        8    /* callback function: zerocb */
    /* Menu Bars, Menus, and Menu Items: */
        /* (no menu bars in the resource file) */
    /* Callback Prototypes: */
int CVICALLBACK quitcb(int panel, int control, int event, void *callbackData, int
eventData1, int eventData2);
int CVICALLBACK startcb(int panel, int control, int event, void *callbackData, int
eventData1, int eventData2);
int CVICALLBACK zerocb(int panel, int control, int event, void *callbackData, int
eventData1, int eventData2);
#ifdef _cplusplus
    }
#endif
                            UNWRAP-CPY.C
#include "includes.h"
void vUnwrapPhase(int N, double dPhase[])
{
    int     i,
                        j;
    double              dDiff[2051],
                        dF,
                        dPi,
                        dPhaseMin,
                        dPhasePrev;
    dPi = 4.0*atan(1.0);
    dPhaseMin = 99999999.0;
    for (i=0; i<N; i++) {
        if (dPhase[i] < dPhaseMin) dPhaseMin = dPhase[i];
    }
    for (i=0; i<N; i++) {
        dPhase[i] = fmod((dPhase[i] - dPhaseMin), 2.0*dPi) + dPhaseMin;
    }
    dPhasePrev = 0.0;
    dF = 0.0;
    for (i=0; i<N; i++) {
        dDiff[i] = dPhase[i] - dPhasePrev;
        if (dDiff[i] > dPi) dF -= 2.0*dPi;
        if (dDiff[i] < -dPi) dF += 2.0*dPi;
        dPhasePrev = dPhase[i];
        dPhase[i] += dF;
    }
}
```

The embodiments of the invention in which an exclusive property or privilege is claimed is defined as follows:

1. A method for calculating a distance from a fiber optic tip of a sensor to a reflective surface comprising:

high pass filtering a fringe signal gathered by a spectrometer;

calculating a power spectral density of the filtered signal; and, using a calibrated distance vs. peak spectral density wavelength curve to determine the measured distance.

2. The method in accordance with claim 1, wherein said sensor comprises a pressure sensor.

3. The method in accordance with claim 1, wherein said sensor comprises a displacement sensor.

4. The method in accordance with claim 1, wherein said sensor comprises a temperature sensor.

5. The method in accordance with claim 1, wherein said sensor comprises an acoustic sensor.

6. The method in accordance with claim 1, wherein said sensor comprises a load sensor.

7. The method in accordance with claim 1, wherein said sensor comprises a magnetic field sensor.

8. The method in accordance with claim 1, wherein said determination of said measured distance comprises a thin film measurement.

* * * * *